United States Patent [19]

Fukuoka et al.

[11] Patent Number: 4,948,871
[45] Date of Patent: Aug. 14, 1990

[54] METHOD FOR PRODUCING A CRYSTALLIZED AROMATIC POLYCARBONATE, AND A CRYSTALLIZED AROMATIC POLYCARBONATE OBTAINED THEREBY

[75] Inventors: Shinsuke Fukuoka; Tomonari Watanabe; Tetsuro Dozono, all of Kurashiki, Japan

[73] Assignee: Asahi Kasei Kogyo Kabushiki Kaisha, Osaka, Japan

[21] Appl. No.: 269,148

[22] PCT Filed: Sep. 28, 1988

[86] PCT No.: PCT/JP88/00989
§ 371 Date: Oct. 28, 1988
§ 102(e) Date: Oct. 28, 1988

[87] PCT Pub. No.: WO89/02904
PCT Pub. Date: Apr. 6, 1989

[30] Foreign Application Priority Data

Sep. 28, 1987 [JP] Japan .................. 62-243000

[51] Int. Cl.$^5$ ............................... C08G 64/40
[52] U.S. Cl. ................... 528/481; 528/125; 528/171; 528/173; 528/196; 528/480; 528/502; 528/503
[58] Field of Search ............ 528/481, 480, 502, 503, 528/196, 125, 171, 173

[56] References Cited

U.S. PATENT DOCUMENTS 3,888,826  6/1975  Yamana .................. 260/47 X A
4,107,143  8/1978  Inata ......................... 528/176

FOREIGN PATENT DOCUMENTS 47-14742    5/1972  Japan .
61460007   12/1981  Japan .
1110736     4/1968  United Kingdom .

Primary Examiner—Harold D. Anderson
Attorney, Agent, or Firm—Berman, Aisenberg & Platt

[57] ABSTRACT

A crystallized aromatic polycarbonate having a weight average molecular weight of from 6,000 to 200,000 and having a terminal hydroxyl group content of not greater than 0.03% by weight based on the weight of the polycarbonate is effectively produced by first heating a mixture of a dihydroxydiaryl compound comprising at least 85 mole % of a dihydroxydiaryl alkane with a diaryl carbonate to prepare a prepolymer having a weight average molecular weight of from 2,000 to 20,000 and having terminal aryl carbonate groups in an amount of greater than 50 mole %, based on the total number of moles of all the terminal groups of the prepolymer, secondly crystallizing the prepolymer and finally subjecting the crystallized prepolymer to solid-state polymerization. The crystallized aromatic polycarbonate does not contain impurities, is colorless and has excellent properties such as resistance to heat and to boiling water. Therefore, the polycarbonate is advantageously used as engineering plastics.

28 Claims, No Drawings

METHOD FOR PRODUCING A CRYSTALLIZED AROMATIC POLYCARBONATE, AND A CRYSTALLIZED AROMATIC POLYCARBONATE OBTAINED THEREBY

DESCRIPTION

1. Technical Field

The present invention relates to a method for producing a crystallized aromatic polycarbonate and a crystallized aromatic polycarbonate obtained thereby. More particularly, the present invention in concerned with an effective method for producing a crystallized aromatic polycarbonate, in which a prepolymer having a specific molecular weight and having a specific proportion of terminal aryl carbonate groups is prepared from a dihydroxydiaryl compound containing at least 85 mole % of a dihydroxydiaryl alkane, and a diaryl carbonate, and after crystallization thereof, the crystallized prepolymer is subjected to solid-state polymerization. Also, the present invention is concerned with a crystallized aromatic polycarbonate produced by the above-mentioned method which does not contain impurities, has a low terminal hydroxyl group content and is colorless and has further excellent properties, such as resistances to heat and to boiling water.

2. Background Art

In recent years, particularly in the last five or six years, aromatic polycarbonates have been widely employed in various fields as engineering plastics which have excellent heat resistance, impact resistance and transparency. Various studies have been made with respect to processes for producing aromatic polycarbonates. Up to now processes, such as one utilizing interfacial polycondensation of an aromatic dihydroxy compound, such as 2,2-bis(4-hydroxyphenyl)propane (hereinafter frequently referred to as "bisphenol A"), with phosgene (hereinafter frequently referred to as the "phosgene process"), have been commercially practiced. In the above-mentioned process, a mixed solvent of water or an aqueous alkali solution and a water-immiscible organic solvent is generally used. Commercially, a mixed solvent of an aqueous sodium hydroxide solution and methylene chloride is employed. As a catalyst for polymerization, a tertiary amine or a quaternary ammonium compound is employed. By-produced hydrogen chloride is removed as a salt with a base. The weight average molecular weight of the produced aromatic polycarbonate is generally about 23,000 to 70,000, normally 25,000 to 35,000.

However, in the interfacial polycondensation process employing phosgene, (1) phosgene (which is toxic) must be used, (2) due to the by-produced chlorine-containing compounds, such as hydrogen chloride and sodium chloride, the apparatus used is likely to be corroded, (3) it is difficult to remove impurities which adversely influence the polymer properties, such as sodium chloride from the polymer, and (4) since methylene chloride (which is generally used as a reaction solvent) is a good solvent for polycarbonate and has a strong affinity to polycarbonate, methylene chloride inevitably remains in produced polycarbonate. To remove the remaining methylene chloride on a commercial scale is extremely costly, and complete removal of the remaining methylene chloride from the obtained polycarbonate is almost impossible. Further, it is noted that the methylene chloride remaining in the polymer is likely to be decomposed, e.g., by heat at the time of molding, thereby forming hydrogen chloride, which not only causes corrosion of a molding machine but also lowers the quality of the polymer.

As mentioned above, the phosgene process involves too many problems to be practiced commercially.

Meanwhile, various methods are known in which an aromatic polycarbonate is produced from an aromatic dihydroxy compound and a diaryl carbonate. For example, a process, which is generally known as a transesterification process or a melt process, is commercially practiced. In the process, a polycarbonate is produced by performing a molten-state ester exchange reaction between bisphenol A and diphenyl carbonate in the presence of a catalyst, while effecting elimination of phenol. However, in order to attain the desired polymerization degree of the final aromatic polycarbonate according to this process, phenol and, finally, diphenyl carbonate need to be distilled off from a formed molten polycarbonate of high viscosity (e.g., 8,000 to 20,000 poise at 280° C.), and it is generally necessary to perform the reaction at a temperature as high as 280° to 310° C. in vacuo as high as 1 mm Hg or less for a period of time as long as, e.g., 4 to 5 hours. Therefore, this process has many disadvantages. For example, (1) both special apparatus (suitable for reaction at high temperatures and under high vacuum) and a special stirrer of great power (useful under the high viscosity conditions of the product to be formed) are needed, (2) due to the high viscosity of the product, when a reactor or stirring type reactor (which is usually employed in the plastic industry) is used, only a polymer having a weight average molecular weight as low as about 30,000 is obtained, (3) due to the high temperature at which the reaction is performed, branching and crosslinking of the polymer are likely to occur, thereby rendering it difficult to obtain a polymer of good quality, and (4) due to long residence time at high temperatures, discoloration of the polymer is likely to occur [see Mikio Matsukane et al, Purasuchikku Zairyo Koza 5 "Porikaboneito Jushi" (Seminar on Plastic Materials 5, "Polycarbonate Resin"), Nikkan Kogyo Shinbun Publishing Co., p. 62–67, Japan (1969)].

Moreover, with respect to polycarbonate obtained by the melt process, the content of terminal hydroxyl groups (—OH groups), for example, 30 to 70 mole % based on the total number of moles of all the terminal groups of the polymer is large due to the polymer structure. Further, it is known that the molecular weight distribution of the polymer is broad, and that the proportion of branched structure is high. Therefore, it is recognized that the polycarbonate produced by the melt process is inferior to that produced by the phosgene process in properties, such as mechanical strength, and that, particularly, the polycarbonate produced by the melt process is disadvantageous because of its brittleness and fracture properties, and it is also poor in moldability because of its non-Newtonian flow behavior [see Mikio Matsukane, "Kobunshi" (High Polymer), Japan, Vol. 27, p. 521 (1978)]. Especially, the high content of terminal hydroxyl groups (—OH groups) in the melt process-produced polycarbonate means that the polycarbonate is poor in properties, such as resistance to heat and boiling water, required for engineering plastics.

Meanwhile, in the production of polyhexamethylene adipamide (nylon 66) and polyethylene terephthalate (PET), which are examples of the most popular condensation type polymers, polymerization is generally conducted by a melt polymerization process until the polymer has a molecular weight at which mechanical properties sufficient for a plastic or a fiber are exhibited. With respect to this production, it is known that the polymerization degree of the thus produced polymer can be further increased by solid-state polymerization in which the polymer is heated at a temperature (at which the polymer can remain in solid-state) at a reduced pressure or atmospheric pressure under a stream of, e.g., dry nitrogen. In this polymerization, it is believed that dehydration condensation is advanced in the solid polymer by the reaction of terminal carboxyl groups with adjacent terminal amino groups or terminal hydroxyl groups. Also, in the case of polyethylene terephthalate, condensation reaction by the elimination of ethylene glycol from the formed polymer occurs to some extent simultaneously with a condensation reaction between functional groups.

The reason why the polymerization degree of nylon 66 and polyethylene terephthate can be increased by solid-state polymerization is that these polymers are inherently crystalline polymers having a high melting point (e.g., 265° C. and 260° C.) and, hence, these polymers can remain sufficiently in solid-state at a temperature at which solid-state polymerization proceeds (e.g., 230° C. to 250° C.). What is more important is that, for the above-mentioned polymers, the compounds to be eliminated are substances, such as water and ethylene glycol, that have a low molecular weight and relatively low boiling point and, therefore, can readily move within and through the solid polymer so that they can be removed from the reaction system as gases.

On the other hand, it has been proposed to employ a method for producing an aromatic polyester carbonate having a high molecular weight in which a high melting temperature aromatic polyester carbonate having both an aromatic ester bond and an aromatic carbonate bond is subjected to melt polymerization, and then subjected to solid-state polymerization. According to this method, an aromatic dicarboxylic acid or aromatic oxycarboxylic acid, such as naphthalene dicarboxylic acid, p-hydroxybenzoic acid or terephthalic acid, is reacted with a dihydroxy aromatic compound and a diaryl carbonate in their molten state to prepare a prepolymer. Then, the prepolymer is crystallized and subjected to solid-state polymerization. If the polymerization degree is increased to some extent by melt polymerization at 260° to 280° C., when p-hydroxybenzoic acid is used, the resultant product is no longer in a molten state but becomes solid. Since the resultant solid is a prepolymer having high crystallinity and a high melting temperature, it is not necessary to crystallize the solid further (see Japanese Patent Application Laid-Open Specification No. 48-22593, Japanese Patent Application Laid-Open Specification No. 49-31796, U.S. Pat. No. 4,107,143, Japanese Patent Application Laid-Open Specification No. 55-98224). However, these methods apply only to the production of an aromatic polyester carbonate containing 30% or more, generally 50% or more, of ester bonds, and it has been reported that, although aromatic polyester carbonate containing less than 30% of ester bonds was intended to be produced, fusion of a prepolymer occurred at the time of solid-state polymerization so that the solid-state polymerization could not be conducted (Japanese Patent Application Laid-Open Specification No. 55-98224).

On the other hand, it is known that the presence of ester bonds as mentioned above promotes the carbonate bond-forming reaction when an aromatic polyester carbonate is produced by a melt condensation polymerization method (see Japanese Patent Application Publication Specification No. 52-36797). According to the Japanese Patent Application Publication Specification No. 52-36797, when a high molecular weight aromatic polycarbonate having ester bonds is produced by melt condensation polymerization, the melt condensation polymerization reaction is markedly promoted by introducing ester bonds, in advance, into the molecular chain of an aromatic polycarbonate having a low polymerization degree. Naturally, it is believed that the above-mentioned effect of promoting the condensation polymerization reaction by the ester bonds may also be exhibited at the time of solid-state polymerization. Therefore, it is relatively facile to increase the polymerization degree by solid-state polymerization with respect to an inherently crystalline aromatic polyester carbonate having a high melting temperature, for example, a polymer having 40 mole % of ester bonds obtained from p-hydroxybenzoic acid, hydroquinone and diphenyl carbonate, or an aromatic polyester carbonate (such as a polymer having 55 mole % of ester bonds obtained from 2,6-naphthalene dicarboxylic acid, bisphenol A and diphenyl carbonate) which can easily become a crystalline polymer having a high melting temperature, by a simple crystallizing operation, for example, by heating at a predetermined temperature lower than the melting temperature.

However, no attempt has been made to produce a high molecular weight aromatic polycarbonate containing no ester bond by a method in which a prepolymer having a low molecular weight is first prepared by melt polymerization, and then the polymerization degree of the prepolymer is increased by solid-state polymerization, except for the case where a specific highly crystalline polycarbonate having a melting temperature as high as 280° C. or more has been produced by solid-state polymerization (see Example 3 of Japanese Patent Application Laid-open Specification No. 52-109591). Japanese Patent Application Laid-open Specification No. 52-109591 discloses a method in which melt polymerization of an aromatic dihydroxyl compound comprising about 70% of hydroquinone and about 30% of bisphenol A with diphenyl carbonate is conducted at 280° C. under an extremely reduced pressure, i.e., 0.5 mm Hg to form a solidified prepolymer having a melting temperature of more than 280° C., and then the polymerization degree of the prepolymer is increased by solid-state polymerization at 280° C. under 0.5 mm Hg for 4 hours.

However, with respect to a substantially amorphous aromatic polycarbonate comprised mainly of a dihydroxydiaryl alkane, such as bisphenol A, no attempt has been made to produce a polymer having a high molecular weight by first forming a prepolymer having a relatively low molecular weight and then subjecting the preplymer to solid-state polymerization. For example, in the phosgene process using an acid acceptor, which is the most representative method for producing an aromatic polycarbonate, since a compound, such as sodium chloride, to be removed from the reaction system to advance the condensation reaction is generally solid in the absence of a solvent, the compound hardly moves within and through solid polymer. Therefore, it is difficult to remove the compound from the reaction system. It is thus infeasible to carry out this method using phosgene in a solid-state system.

With respect to a method for producing the most popular aromatic polycarbonate i.e., a polycarbonate derived from bisphenol A by transesterification between bisphenol A and diphenyl carbonate, all of the studies have been directed toward a melt polymerization process at high temperature under highly reduced pressure. Studies have never been directed toward a method in which a prepolymer having a relatively low polymerization degree is first prepared, and then the polymerization degree of the prepolymer is increased by solid-state polymerization to obtain a polycarbonate having a high molecular weight. Because polycarbonates derived from bisphenol A are amorphous polymers having a glass transition temperature (Tg) of from 149° to 150° C., it has been considered to be infeasible to subject polycarbonates derived from bisphenol A to solid-state polymerization. In other words, in order for a prepolymer to be susceptible to solid-state polymerization, it is generally required that the prepolymer not be fused but maintain its solid-state at a temperature higher than the glass transition temperature of the prepolymer (if the temperature is lower than the glass transition temperature of the prepolymer, molecular motion does not occur, thus precluding solid-state polymerization). Amorphous polycarbonate which melts at a temperature of 150° C. or more is practically not susceptible to solid-state polymerization.

The present invention has been made with a view toward obviating the various drawbacks of the conventional methods for producing a polycarbonate, e.g., the phosgene and melt processes, and with a view toward providing a method for effectively producing a high-quality aromatic polycarbonate having a high molecular weight, which substantially does not contain impurities, such as chlorine compounds, and has a low terminal hydroxyl group content.

3. Disclosure of The Invention

The present inventors have made extensive and intensive studies with respect to a method for producing an aromatic polycarbonate in which a transesterification reaction is utilized. As a result, it has been found that a substantially amorphous prepolymer having a relatively low molecular weight [as obtained by effecting preliminary polymerization of a) a dihydroxydiaryl compound comprising 85 to 100 mole % of a dihydroxydiaryl alkane of formula (I), described later, and 0 to 15 mole % of a dihydroxydiaryl derivative other than the alkane with b) a diaryl carbonate] can readily be crystallized. It has also been found that, when the crystallized prepolymer is heated at a temperature lower than the melting temperature of the crystals, i.e., at a temperature at which the crystallized prepolymer can maintain its solid-state, solid-state polymerization of the crystallized prepolymer can easily proceed. It has further been found that an aromatic polycarbonate having a high molecular weight can readily be produced by adjusting the molecular weight and terminal group proportions of the prepolymer prior to crystallization and adjusting the crystallinity of the crystallized prepolymer to specific ranges. The present invention has been completed on the basis of these novel findings.

Accordingly, in one aspect of the present invention, there is provided a method for producing a crystallized aromatic polycarbonate which comprises the steps of:

(1) heating a mixture of a dihydroxydiaryl compound and a diaryl carbonate at a temperature sufficient and for a period of time sufficient to prepare a prepolymer having a weight average molecular weight of from 2,000 to 20,000 and having terminal aryl carbonate groups, said dihydroxydiaryl compound comprising 85 to 100 mole % of a dihydroxydiaryl alkane represented by the formula:

$$HO-Ar^1-Y-Ar^2-OH \qquad (I)$$

wherein each of $Ar^1$ and $Ar^2$ independently represents a divalent carbocyclic or heterocyclic aromatic group, and Y represents a divalent alkane group, and 0 to 15 mole % of a dihydroxydiaryl derivative other than said dihydroxydiaryl alkane, said terminal aryl carbonate groups being present in an amount of greater than 50 mole % based on the total number of moles of all the terminal groups of the prepolymer;

(2) crystallizing said prepolymer to a crystallinity of from 5 to 55%; and (3) heating the crystallized prepolymer at a temperature which is higher than the glass transition temperature of said crystallized prepolymer and at which said crystallized prepolymer is in a solid-state, thereby increasing the weight average molecular weight of the crystallized prepolymer to from 6,000 to 200,000 so that the resultant polymer has a weight average molecular weight which is greater than that of said prepolymer obtained in step (1).

In another aspect of the present invention, there is provided a crystallized aromatic polycarbonate having a weight average molecular weight of from 6,000 to 200,000 and having a terminal hydroxyl group content of not greater than 0.03% by weight, based on the weight of the polycarbonate, which is the same as that produced by the above-mentioned method.

As described above, in the present invention, solid-state polymerization has for the first time been realized with respect to an aromatic polycarbonate by preparing a substantially amorphous prepolymer and then crystallizing the prepolymer prior to the solid-state polymerization. By practicing the method of the present invention, an aromatic polycarbonate having a high molecular weight can readily be produced.

Generally, to render feasible solid-state polymerization for increasing the polymerization degree of a prepolymer, it is necessary to preclude melting or melt adhesion of the prepolymer at a temperature at which polymerization proceeds. However, in solid-state polymerization, it is necessary that motion of by-produced substances and reaction be performed within a solid, and that the reaction temperature be increased to expedite reaction rate since such rate is generally not so high within the solid. Therefore, the prepolymer must have a melting temperature as high as possible, which is difficult to provide. According to the present invention, this problem has successfully been resolved by prepolymer crystallization prior to solid-state polymerization.

In the conventional transesterification process conducted in molten-state, final heating must be performed at a temperature as high as 300° C. or more in an extreme vacuo, i.e., 0.1 mm Hg or less, to remove phenol and diphenyl carbonate from a highly viscous molten mixture. By contrast, in the present method, surprisingly, polymerization of prepolymer to a high molecular weight polymer readily occurs at a temperature far lower than 300° C. while removing an aromatic monohydroxy compound and a diaryl carbonate, each having a relatively high boiling point, from a crystallized prepolymer in solid-state.

In the method of the present invention, in step (1) (hereinafter frequently referred to as the "prepolymerization"), a prepolymer having a weight average molecular weight of from 2,000 to 20,000 and having terminal aryl carbonate groups, the terminal aryl carbonate groups being present in an amount of greater than 50 mole %, based on the total number of moles of all the terminal groups of the prepolymer, is prepared by heating a mixture of a dihydroxydiaryl compound and a diaryl carbonate.

In the method of the present invention, a dihydroxydiaryl compound is used as a starting material. From 85 to 100 mole % of the dihydroxydiaryl compound is a dihydroxydiaryl alkane represented by the formula:

$$HO-Ar^1-Y-Ar^2-OH \qquad (I)$$

wherein each of $Ar^1$ and $Ar^2$ independently represents a divalent carbocyclic or heterocyclic aromatic group, and Y represents a divalent alkane group.

As each of $Ar^1$ and $Ar^2$, a divalent carbocyclic or heterocyclic aromatic group having from 5 to 30 carbon atoms is preferred. As Y, a divalent alkane group having from 1 to 30 carbon atoms is preferred.

Each of divalent aromatic groups $Ar^1$ and $Ar^2$ is either unsubstituted or substituted with at least one substituent which does not adversely affect the reaction. Examples of suitable substituents include a halogen atom, a lower alkyl group, a lower alkoxy group, a phenyl group, a phenoxy group, a vinyl group, a cyano group, an ester group, an amide group and a nitro group.

As heterocyclic aromatic, as used throughout this disclosure, aromatic rings having one or more ring nitrogen atoms are preferred, and no other hetero ring atoms need to be present.

Representative examples of divalent aromatic groups include a phenylene group, a napthylene group, a biphenylene group and a pyridylene group, each of which is unsubstituted or substituted with at least one substituent, as mentioned above.

Representative examples of divalent alkane groups include organic groups represented by the formulae:

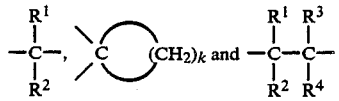

wherein each of $R^1$, $R^2$, $R^3$ and $R^4$ independently represents a hydrogen atom, a lower alkyl group, a lower alkoxy group, a cycloalkyl group having from 5 to 10 ring carbon atoms, a carbocyclic aromatic group having from 5 to 10 ring carbon atoms or a carbocyclic aralkyl group having from 6 to 10 carbon atoms, and k represents an integer of from 3 to 11, inclusive.

Preferred examples of dihydroxydiaryl alkanes include those of the formulae:

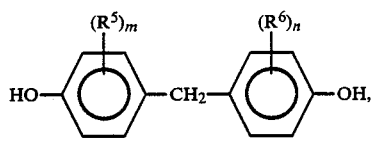

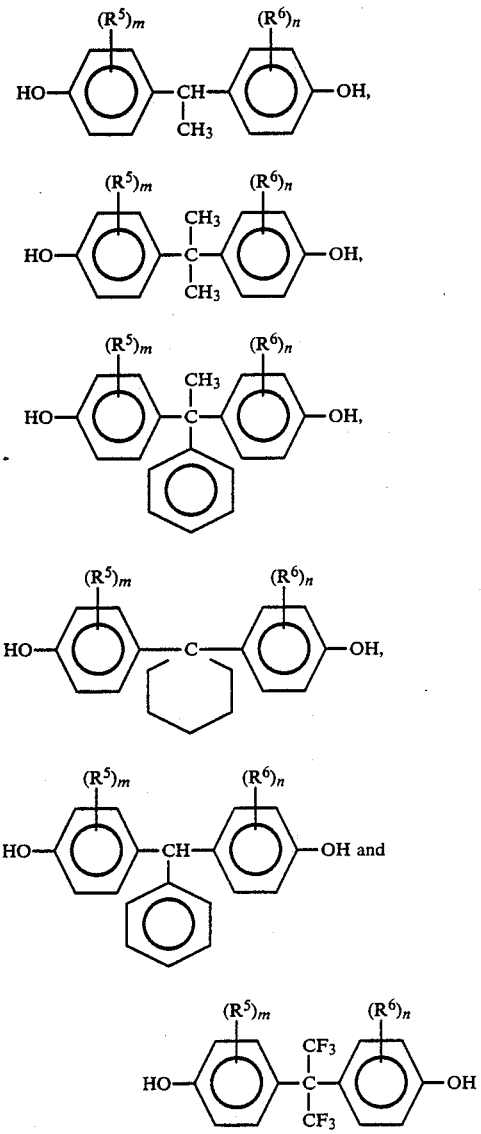

wherein each of $R^5$ and $R^6$ independently represents a hydrogen atom, a halogen atom, a lower alkyl group, a lower alkoxy group, a cycloalkyl group having from 5 to 10 ring carbon atoms or a phenyl group; each of m and n independently represents an integer of from 1 to 4; when m is an integer of from 2 to 4, each $R^5$ may be the same or different; and when n is an integer of from 2 to 4, each $R^6$ may be the same or different.

Of these compounds, bisphenol A, i.e., 2,2-bis(4-hydroxyphenyl)propane and a substituted bisphenol A are particularly preferred. The dihydroxydiaryl alkanes may be used individually or in combination. When two or more different dihydroxydiaryl alkanes are used, a final aromatic polycarbonate is generally obtained in the form of a copolymer containing two or more different units derived therefrom.

In addition to the dihydroxydiaryl alkane there may be employed a dihydroxydiaryl derivative other than the dihydroxydiaryl alkane in an amount of from 0 to 15 mole %. There is no particular restriction with respect to the structure of the dihydroxydiaryl derivative. However, it is preferred to use a dihydroxydiaryl derivative represented by the following formula:

$$HO-Ar^1-Z-Ar^2-OH \qquad (II)$$

wherein $Ar^1$ and $Ar^2$ are as defined above and Z represents a bond, —O—, —CO—, —S—, —SO—, —SO$_2$—, or —CON($R^1$)—, wherein $R^1$ is as defined above.

Examples of dihydroxydiaryl derivatives other than dihydroxydiaryl alkanes include dihydroxybiphenyls of the formulae:

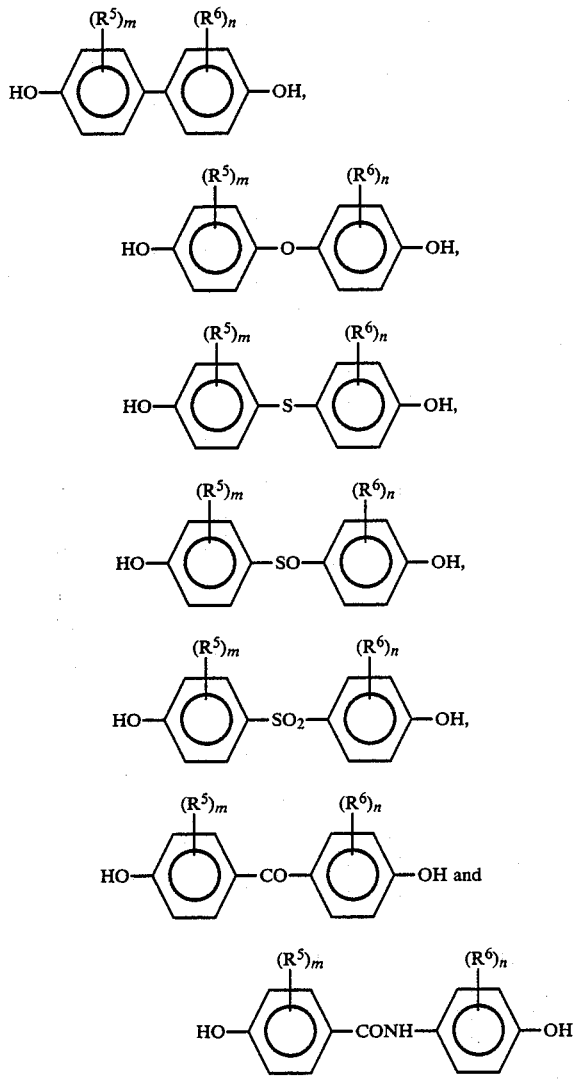

wherein $R^5$, $R^6$, m and n are as defined above.

In the method of the present invention, a compound containing three or more phenolic hydroxyl groups in the molecule may be added to the dihydroxydiaryl compound in an amount of about 0.01 to 3 mole %, based on the moles of the dihydroxydiaryl compound. Examples of such a compound containing three or more phenolic hydroxyl groups include phloroglucin; phloroglucide; 4,6-dimethyl-2,4,6-tri(4'-hydroxyphenyl)-heptene-2; 2,6-dimethyl-2,4,6-tri(4'-hydroxyphenyl)-heptene-3; 4,6-dimethyl-2,4,6-tri(4'-hydroxyphenyl)-heptane; 1,3,5-tri-(4'-hydroxyphenyl)-benzene; 1,1,1-tri-(4'-hydroxyphenyl)-ethane; 2,2-bis-[4,4-bis(4'-hydroxphenyl) cyclohexyl]-propane; 2,6-bis-(2'-hydroxy-5'-methylbenzyl)-4-methylphenol: 2,6-bis(2-'hydroxy-5'-isopropylbenzyl)-4-isopropylphenol; bis-[2-hydroxy-3-(2'-hydroxy-5'-methylbenzyl)-5-methylphenyl]-methane; tetra-(4-hydroxyphenyl)methane; tri-(4-hydroxyphenyl)phenylmethane; bis(2,4-dihydroxyphenyl)ketone; 1,4-bis-(4',4''-dihydroxytriphenylmethyl)benzene; 1,4-dimethyl-1,4-bis(4'-hydroxy-3-methylphenyl)-6-hydroxy-7-methyl-1,2,3,4-tetralin; and 2,4,6-tri(4'-hydroxyphenylamino)-S-triazine.

In the method of the present invention, the dihydroxydiaryl compound is reacted with a diaryl carbonate. The diaryl carbonate is a carbonate ester of an aromatic monohydroxy compound, which is represented by the formula:

$$Ar^3-O\underset{\underset{O}{\|}}{C}O-Ar^4 \qquad (III)$$

wherein each of $Ar^3$ and $Ar^4$ each independently represents a monovalent carbocyclic or heterocyclic aromatic group.

As each of $Ar^3$ and $Ar^4$, a monovalent carbocyclic or heterocyclic aromatic group having from 5 to 12 carbon atoms is preferred.

Each of monovalent aromatic groups $Ar^3$ and $Ar^4$ may be unsubstituted or substituted with at least one substituent which does not adversely affect the reaction. Examples of such substituents include a halogen atom, a lower alkyl group, a lower alkoxy group, a phenyl group, a phenoxy group, a vinyl group, a cyano group, an ester group, an amide group and a nitro group.

Representative examples of monovalent aromatic groups include a phenyl group, a napthyl group, a biphenyl group and a pyridyl group, each of which is unsubstituted or substituted with at least one substituent, as mentioned above.

Representative examples of diaryl carbonates include diphenyl carbonates represented by the formula:

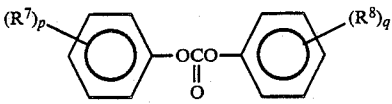

wherein each of $R^7$ and $R^8$ independently represents a hydrogen atom, a halogen atom, a lower alkyl group, a lower alkoxy group, a cycloalkyl group having from 5 to 10 ring carbon atoms or a phenyl group; and each of p and q independently represents an integer of from 1 to 5; with the proviso that when p is an integer of from 2 to 5, each $R^7$ may be the same or different, and when q is an integer of from 2 to 5, each $R^8$ may be the same or different.

Of these diphenyl carbonates, there are preferably used diaryl carbonates having a symmetrical configuration, such as diphenyl carbonate, ditolyl carbonate and diphenyl carbonate substituted with a lower alkyl group, e.g. di-t-butylphenyl carbonate. Of them, diphenyl carbonate, which is a diaryl carbonate having the simplest structure, is particularly preferred.

The above-mentioned diaryl carbonates are used individually or in combination. However, when two or more different types of diaryl carbonates are used, the reaction system becomes complicated with little advantage. Therefore, it is preferred to use one type of diaryl carbonate having a symmetrical configuration, individually.

In the method of the present invention, a prepolymer prepared in the pre-polymerization step as step (1) is crystallized in step (2), and then the crystallized prepolymer is subjected to solid-state polymerization in step (3). In the pre-polymerization step (1), a mixture of a dihydroxydiaryl compound and a diaryl carbonate is heated, while releasing a by-produced aromatic monohydroxy compound having a structure such that a hydroxyl group is bonded to an aryl group derived from the diaryl carbonate, to obtain a prepolymer.

The weight average molecular weight of the prepolymer prepared in the pre-polymerization step (1) is generally within the range of from 2,000 to 20,000, preferably from 2,500 to 15,000, more preferably from 4,000 to 12,000. When the weight average molecular weight is less than 2,000, the solid-state polymerization disadvantageously takes a long period of time. On the other hand, it is unnecessary to prepare a prepolymer having a weight average molecular weight of more than 20,000, because the increased weight average molecular weight of the prepolymer does not have any special effect on the subsequent solid-state polymerization. The weight average molecular weight of the prepolymer can be controlled by appropriately selecting reaction conditions, such as temperature, time, pressure and agitation rate.

The pre-polymerization is preferably effected in molten state. Since the melt viscosity of a prepolymer having a weight average molecular weight within the above-mentioned range is not so high, it is facile to effect the pre-polymerization in molten state on a commercial scale.

The pre-polymerization is optionally performed in a solvent which is inert to the pre-polymerization reaction, such as methylene chloride, chloroform, 1,2-dichloroethane, tetrachloroethane, dichlorobenzene, tetrahydrofuran, diphenylmethane and diphenyl ether. However, in general, the pre-polymerization is performed in a molten state in the absence of a solvent.

The ratio of the diaryl carbonate to be charged to the dihydroxydiaryl compound to be charged varies, depending on the types of the employed diaryl carbonate and dihydroxydiaryl compound, the reaction temperature and other reaction conditions. However, in general, the diaryl carbonate is used in an amount of from 0.9 to 2.5 moles, preferably from 0.95 to 2.0 moles, more preferably from 1.01 to 1.5 moles per mole of the dihydroxydiaryl compound.

The terminal groups of the prepolymer prepared in the pre-polymerization are generally comprised of terminal aryl carbonate groups represented, for example, by the formula:

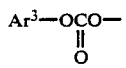

wherein $Ar^3$ is as defined above, and terminal hydroxyl groups derived from the dihydroxydiaryl compound, which is represented, for example, by the formula

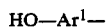

wherein $Ar^1$ is as defined above. In order to have the proportion of the terminal aryl carbonate groups (relative to all the terminal groups of the prepolymer) greater than 50 mole %, it is necessary that the diaryl carbonate be present in the reaction system in excess relative to the dihydroxydiaryl compound. Therefore, it is preferred that the diaryl carbonate be present in the reaction system in an amount of from 1.001 to 1.10 mole per mole of the dihydroxydiaryl compound. Under some reaction conditions, a portion of either or both of the compounds to be reacted with each other is distilled off in the course of the pre-polymerization reaction. In such a case, it is preferred to add either of the compounds in the course of the pre-polymerization reaction so as to adjust the ratio of the compounds to a predetermined ratio.

When the pre-polymerization is so performed that a formed prepolymer has terminal aryl carbonate groups in an amount of greater than 50 mole %, based on the total number of moles of all the terminal groups, not only the discoloration of the prepolymer during the course of the pre-polymerization but also the discoloration of the aromatic polycarbonate during the course of the solid-state polymerization is greatly relieved, and, in addition the aromatic polycarbonate finally obtained is excellent in resistance to heat and boiling water due to the extremely small content of terminal hydroxyl groups in the aromatic polycarbonate as mentioned below.

As mentioned above, it is necessary that the proportion of the terminal aryl carbonate groups relative to all the terminal groups of the prepolymer be greater than 50 mole %. In addition, when the proportion (x, mole %) of the terminal aryl carbonate groups relative to all the terminal groups of the prepolymer and the weight average molecular weight (Mw) of the prepolymer satisfy the following relationship (x, mole %), an aromatic polycarbonate which is free from discoloration and has excellent physical properties, such as resistance to heat and boiling water, is readily obtained.

when $2,000 \leq Mw \leq 5,000$, $50 < x \leq 100$; and
when $5,000 < Mw \leq 20,000$ $0.002\ Mw + 40 \leq x \leq 100$.

The reaction temperature and the reaction time for the pre-polymerization vary depending on the types and amounts of dihydroxydiaryl compound and diaryl carbonate, the type and amount of catalyst, if any, the intended polymerization degree of the prepolymer, and other reaction conditions. However, in general, the reaction temperature is in the range of from 50° to 350° C., preferably from 100° to 320° C., and the reaction time is in the range of from 1 minute to 100 hours, preferably from 2 minutes to 10 hours.

For preparing a prepolymer free from discoloration, it is preferred to effect the pre-polymerization at a temperature as low as possible and for a period of time as short as possible. For this reason, it is particularly preferred to effect the pre-polymerization at a temperature in the range of from 150° to 280° C. and for a period of time in the range of from several minutes to several hours. In the method of the present invention, the pre-polymerization step is provided only for preparing a prepolymer having a relatively low molecular weight. A prepolymer which has a desired degree of polymerization and is colorless and transparent, can be readily prepared under the above-mentioned reaction conditions.

In the pre-polymerization in step (1), as the reaction proceeds, an aromatic monohydroxy compound of a structure in which a hydroxyl group is bonded to an aryl group derived from the diaryl carbonate, is formed. By removing the formed aromatic monohydroxy compound from the reaction system, the reaction rate is increased. Therefore, the aromatic monohydroxy compound is preferably removed from the reaction system by a method in which an inert gas, such as nitrogen, argon, helium or carbon dioxide, or a lower hydrocarbon gas is introduced into the reaction system while agitating the reaction system, so that the aromatic monohydroxy compound is entrained by such gas and removed from the reaction system together with the gas, or a method in which the pre-polymerization is conducted under reduced pressure. These two methods are optionally conducted in combination.

It is preferred that the pre-polymerization be effected in the absence of a catalyst. However, if desired, a polymerization catalyst is optionally used in the pre-polymerization in order to increase the polymerization rate. As the polymerization catalyst, any condensation polymerization catalyst conventionally used in the art can be used. Examples of such catalysts include hydroxides of an alkali or alkaline earth metal, such as lithium hydroxide, sodium hydroxide, potassium hydroxide and calcium hydroxide; hydrides of an alkali or alkaline earth metal, such as lithium hydride, sodium hydride and calcium hydride; alkali metal salts, alkaline earth metal salts and quarternary ammonium salts of boron hydride or aluminum hydride, such as lithium aluminum hydride, sodium boron hydride and tetramethyl ammonium boron hydride; alkoxides of an alkali or alkaline earth metal, such as lithium methoxide, sodium ethoxide and calcium methoxide; aryloxides of an alkali or alkaline earth metal, such as lithium phenoxide, sodium phenoxide, magnesium phenoxide, LiO—Ar—OLi wherein Ar is an aryl group and NaO—Ar—ONa wherein Ar is as defined above; organic acid salts of an alkali or alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate and triphenyl borate; silicon compounds, such as silicon oxide, sodium silicate, tetraalkysilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, diaryltin oxide, dialkyltin carboxylate, tin acetate, tin compounds having an alkoxy group or aryloxy group bonded to tin, such as ethyltin tributoxide and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxides; and zirconium compounds, such as zirconium acetate, zirconium oxide, zirconium alkoxides and aryloxides and ziroconium acetylacetone.

These catalysts are used individually or in combination. The amount of catalyst to be used is as follows. When a catalyst containing a metal is used, the amount of the catalyst is in the range of from 0.5 ppm to 1% by weight, preferably from 1 ppm to 0.5% by weight, in terms of the amount of the metal contained in the catalyst, based on the weight of the aromatic dihydroxydiaryl compound used as the starting material. On the other hand, when a catalyst containing no metal is used, the amount of the catalyst is in the range of from 0.5 ppm to 1% by weight, preferably from 1 ppm to 0.5% by weight, in terms of the amount of the element contained in the catalyst which is destined to become a cation, based on the weight of the aromatic dihydroxydiaryl compound used as the starting material.

The catalyst as mentioned above usually remain in the final aromatic polycarbonate. These residual catalysts often have adverse effects on the properties of the polymer. Therefore, it is preferred that the amount of a catalyst be as small as possible.

In the method of the present invention, the pre-polymerization step is provided only for preparing a prepolymer having a relatively low molecular weight. The intended prepolymer can readily be prepared in the absense of any catalyst. This is one of the main features of the present invention. In the present invention, the terminology "in the absence of a catalyst" means that the amount of a catalyst is substantially zero, or the amount a catalyst, if any, is smaller than 0.5 ppm, that is the minimum in the above-mentioned amount range.

By the pre-polymerization described above, there is readily prepared a prepolymer having a weight average molecular weight (Mw) of from 2,000 to 20,000 and containing terminal aryl carbonate groups in an amount of greater than 50 mole %, based on the total number of moles of all the terminal groups of the prepolymer.

In the preferred mode of pre-polymerization, the pre-polymerization is conducted in molten state in the absense of a solvent. A prepolymer obtained by cooling the prepared prepolymer to room temperature generally has low crystallinity and is substantially amorphous. It is practically impossible to subject such an amorphous prepolymer to solid-state polymerization because the prepolymer is melted at temperatures higher than the glass transition temperature of the prepolymer. For this reason, it is necessary to effect step (2) i.e., crystallization of the prepolymer (hereinafter often referred to as the "prepolymer crystallization").

In the pre-polymerization step of the present invention, a relatively low molecular weight prepolymer having a weight average molecular weight of from 2,000 to 20,000 and having terminal aryl carbonate groups in an amount of greater than 50 mole %, based on the total number of moles of all the terminal groups of the prepolymer, is produced. In the art, no attempt has been directed toward crystallization of a prepolymer having such a relatively low molecular weight, although various studies have been made on the crystallization of aromatic polycarbonates having a high molecular weight prepared by the phosgene process.

With respect to step (2), the method of crystallizing the prepolymer is not particularly limited. However, it is preferred that the crystallization be effected by solvent treatment or by heat treatment.

In the solvent treatment method, the prepolymer is crystallized using a suitable solvent. Examples of solvent treatment methods include (1) a method in which the prepolymer is dissolved in a solvent to prepare a solution, and a crystallized prepolymer is then deposited from the solution, and (2) a method in which the prepolymer is brought into contact with a poor solvent (or the vapor of the poor solvent) for the prepolymer, for example, a solvent in which the solubility of the prepolymer is about 10% or less for a period of time sufficient to allow the solvent to permeate into the prepolymer, crystallizing the prepolymer.

In method (1) in which a crystallized prepolymer is deposited from the solution, deposition of a crystallized prepolymer from the solution is performed, for example, by removing the solvent from the solution by evaporation, or by adding a poor solvent for the prepolymer to the solution. The solvent removal process is preferred for its simplicity in operation. In method (2), the period of time sufficient for the solvent to permeate the prepolymer and to crystallize the prepolymer varies depending on the type, molecular weight and shape of the prepolymer, the type of the solvent, the treatment temperature and the like, but it is generally in the range of from several seconds to several hours. The treatment temperature is generally in the range of from $-10°$ to $200°$ C.

Solvents which are suitably employed for the solvent treatment of the prepolymer include, for example, aliphatic halogenated hydrocarbons, such as chloromethane, methylene chloride, chloroform, carbon tetrachloride, chloroethane, dichloroethane (position isomers), trichloroethane (position isomers), trichloroethylene and tetrachloroethane (position isomers); halogenated aromatic hydrocarbons, such as chlorobenzene and dichlorobenzene; ethers, such as tetrahydrofuran and dioxane; esters, such as methyl acetate and ethyl acetate; ketones, such as acetone and methyl ethyl ketone; and aromatic hydrocarbons, such as benzene, toluene and xylene. These solvents are used individually or in combination.

The amount of solvent used for the solvent treatment of the prepolymer varies depending upon the type of the prepolymer, the type of the solvent, the desired crystallinity, and the temperature for the solvent treatment. However, the solvent is generally used in an amount of from 0.05 to 100 times by weight, preferably from 0.1 to 50 times as large as the amount of the prepolymer.

In the present invention, even when a chlorine-containing solvent, such as methylene chloride, is used for the solvent treatment of the prepolymer, it is relatively easy to prevent the crystallized prepolymer from being contaminated with the chlorine-containing solvent because the prepolymer has a relatively low molecular weight. On the other hand, in the phosgene process, it is necessary to distill off methylene chloride from a final aromatic polycarbonate product having a high molecular weight. However, it is difficult to completely remove methylene chloride from the final aromatic polycarbonate product having a high molecular weight. In contrast, in the method of the present invention, even when methylene chloride is not completely removed in the prepolymer crystallization step, methylene chloride can be almost completely removed in the solid-state polymerization step (3) subsequent to the crystallization of the prepolymer. Therefore, an aromatic polycarbonate prepared by the method of the present invention contains substantially no chlorine values ascribed to a chlorine-containing solvent. The terminology "an aromatic polycarbonate containing substantially no chlorine values" used herein means an aromatic polycarbonate whose chlorine atom content does not exceed about 1 ppm by weight, based on the aromatic polycarbonate. When a solvent containing no chlorine atoms is used, it is, of course, possible to obtain an aromatic polycarbonate containing no chlorine atoms as long as a dihydroxydiaryl compound containing no chlorine atoms and a diaryl carbonate containing no chlorine atoms are used as raw materials.

In the heat crystallization method, the prepolymer is heated at a temperature which is higher than the glass transition temperature of the prepolymer, but lower than the melting temperature of the prepolymer, to crystallize the prepolymer. According to this heat crystallization method, the prepolymer is readily crystallized by simply keeping the prepolymer in a heated environment. Accordingly, this crystallization method is readily carried out on a commercial scale. It is surprising that a substantially amorphous prepolymer having a relatively low molecular weight and having a terminal aryl carbonate groups in an amount of greater than 50 mole %, based on the total number of moles of all the terminal groups of the prepolymer can be crystallized by the simple method as mentioned above.

There is no particular limitation with respect to the temperature (Tc, °C.) for the heat crystallization method as long as Tc is in the above-mentioned range, that is, in a temperature range which is higher than the glass transition temperature of the prepolymer but lower than the melting temperature Tm(°C.) of the prepolymer. However, because the crystallization rate of the prepolymer is low at low temperature, it is preferred that the temperature (Tc, °C.) for the heat crystallization method be in the following range (IV).

$$Tm-50 \leq Tc < Tm \qquad (IV).$$

The heat crystallization of the prepolymer is carried out, e.g., by heating the prepolymer at a temperature kept constant within the above-mentioned range or while changing the temperature continuously or discontinuously within the above-mentioned range. These temperature controllings are optionally used in combination for crystallization of the prepolymer. Because the melting temperature of the prepolymer generally becomes higher as the crystallization proceeds, it is preferred to employ a crystallization method in which a heating temperature is raised at the same rate as the rising rate of the melting temperature of the prepolymer. This heat crystallization method (in which a temperature is raised) is effective not only for rapidly crystallizing the prepolymer but also for elevating the melting temperature of the prepolymer, as compared to the method in which a heating temperature is kept constant.

The period of time for the heat crystallization varies depending upon the chemical composition of the prepolymer, the presence or absence of a catalyst, and the temperature and method to be employed for the crystallization of the prepolymer. The period of time is generally in the range of from 1 to 200 hours.

The crystallization of the prepolymer in the crystallization step is readily confirmed, since the transparency of the prepolymer is lost by crystallization and the prepolymer becomes opaque. The crystallization of the prepolymer is also confirmed by X-ray diffraction. Since the prepolymer prepared using bisphenol A as a dihydroxydiaryl compound and diphenyl carbonate as a diaryl carbonate is amorphous, no peak representing the crystalline structure of the prepolymer appears in the X-ray diffraction pattern. On the other hand, with respect to the prepolymer which has been crystallized, an X-ray diffraction pattern containing, as a main peak, a peak at about 17°(2θ), which represents the crystalline structure of the polymer, is obtained.

As mentioned above, an amorphous prepolymer is crystallized in the crystallization step. The crystallinity of the prepolymer varies depending upon the types of dihydroxydiaryl compound and diaryl carbonate as raw materials, the polymerization degree of the prepolymer, the presence or absence of a catalyst in the crystallization system and other conditions in the crystallization step. The crystallinity is generally in the range of from 3 to 75%.

It is possible to convert the crystallized prepolymer having a crystallinity in the above-mentioned range to a polymer having a high molecular weight in the subsequent step (3) (solid-state polymerization step). In commercially practicing crystallization of the prepolymer, it is preferred to use a crystallized prepolymer having a crystallinity of from 5 to 55%. The use of a crystallized prepolymer having a crystallinity of less than 5% in the subsequent solid-state polymerization is disadvantageous in that the melting temperature of the prepolymer having such low crystallinity is still low, and hence the prepolymer is likely to be melted in the course of the solid-state polymerization. This means that solid-state polymerization cannot be performed or (even when it is possible to conduct the solid-state polymerization by employing relatively low temperatures at which the prepolymer maintains its solid state) the solid-state polymerization takes an extremely long period of time. Therefore, it is practically disadvantageous to use a crystallized prepolymer having a crystallinity of less than 5%. On the other hand, the use of a crystallized prepolymer having a crystallinity of greater than 55% is also disadvantageous; since the rate of the solid-state polymerization becomes low, the solid-state polymerization must be conducted for an extremely long period of time. Therefore, it is also practically disadvantageous to employ a crystallized prepolymer having a crystallinity of greater than 55%. For the above-mentioned reasons, a crystallized prepolymer (to be employed) preferably has a crystallinity of from 5 to 55%, more preferably from 10 to 45%.

According to the present invention, the crystallinity of the crystallized prepolymer is determined by using the powder X-ray diffraction patterns of a completely amorphous prepolymer and a crystallized prepolymer (for example, see the patterns shown in FIG. 1 and FIG. 2, and the patterns shown in FIG. 3 and FIG. 4).

Generally, when a crystalline polymer is irradiated with an X-ray, scattered X-rays are observed. The total intensity of the scattered X-rays is a sum of the X-ray intensity of the crystalline scattering ascribed to the crystalline portion and that of the amorphous scattering ascribed to the amorphous portion. When the weight of the crystalline portion and that of the amorphous portion are expressed as $M_c$ and $M_a$, respectively, and when the X-ray intensity of the crystalline scattering corresponding to the weight of the crystalline portion and that of the amorphous scattering corresponding to the weight of the amorphous portion are expressed as $I_c$ and $I_a$, respectively, and $I_c$ and $I_a$ are assumed to be able to be distinguished from each other, the crystallinity $X_c$ (%) is calculated from the following equations:

$$Xc = \frac{Mc}{Mc + Ma} \times 100 = \frac{Ic}{Ic + KIa} \times 100$$

$$K = \frac{I_{100c}}{I_{100a}}$$

wherein $I_{100c}$ represents the X-ray intensity of a crystalline scattering per unit weight of the perfectly crystalline portion and $I_{100a}$ represents the X-ray intensity of an amorphous scattering per unit weight of the perfectly amorphous portion.

However, in the present invention, assuming that K=1 with respect to all the crystallized prepolymers, the crystallinity Xc (%) was calculated from the following equation:

$$Xc = \frac{I_c}{I_c + I_a} \times 100$$

The total X-ray diffraction intensity of a sample obtained by X-ray diffractometry is obtained as a sum of the crystalline scattering intensity, the amorphous scattering intensity and the background intensity due to the scattering by air, the scattering ascribed to the thermal motion of atoms, the Compton scattering and the like. Therefore, for obtaining the crystallinity of the sample, it is necessary to separate the total X-ray diffraction intensity into the component intensities mentioned above.

In the present invention, the total X-ray diffraction intensity is separated into the component intensities as follows. An explanation is given referring to FIGS. 1 and 2.

On the powder X-ray diffraction pattern of a crystallized prepolymer (shown in FIG. 2), straight line P-Q (base line) is drawn between the point (P) of 10°(2θ) and the point (Q) of 35°(2θ). The point corresponding to 15°(2θ) on the diffraction intensity curve and the point corresponding to 15°(2θ) on the base line, at each of which points the crystalline scattering intensity is considered to be zero, are designated R and S, respectively.

On the other hand, on the powder X-ray diffraction pattern of a completely amorphous prepolymer (shown in FIG. 1) (obtained by melting the prepolymer at a temperature of from 280° to 300° C., shaping the molten prepolymer into a sheet form having a thickness of about 1 mm, and rapidly cooling the sheet to 0° C., straight line K-L (base line) is drawn. Further, the point corresponding to 15°(2θ) on the diffraction intensity curve and the point corresponding to 15°(2θ) on the base line are designated M and N, respectively.

The following identities are given:
$I_1$ = the diffraction intensity at point M
$B_1$ = the diffraction intensity at point N
$I_2$ = the diffraction intensity at point R
$B_2$ = the diffraction intensity at point S
Y = the area of the portion surrounded by diffraction intensity curve K-M-L and straight line K-L, and
Z = the area of the portion surrounded by diffraction intensity curve P-R-Q and straight line P-Q.

The crystallinity Xc (%) is calculated from the following equation:

$$Xc\,(\%) = \frac{1}{Z}\left(Z - \frac{I_2 - B_2}{I_1 - B_1} \cdot Y\right) \times 100$$

For example, the crystallinity of the crystallized prepolymer obtained in Example 1 was about 30%, as calculated according to the above-mentioned method.

The crystallized prepolymer prepared in the prepolymer crystallization step is readily converted to an aromatic polycarbonate having a high molecular weight by the treatment in step (3) (hereinafter frequently referred to as the "solid-state polymerization"), in which the crystallized prepolymer is heated at a temperature which is higher than the glass transition temperature of the crystallized prepolymer and at which the crystallized prepolymer is in a solid state.

In the solid-state polymerization, it is believed that polycondensation proceeds through two different types of reactions between the two types of terminal groups contained in the crystallized prepolymer, i.e., terminal aryl carbonate groups and terminal hydroxyl groups. One of the reactions is a reaction of a terminal hydroxyl group with a terminal aryl carbonate group, by which polycondensation proceeds while releasing an aromatic monohydroxyl compound having its hydroxyl group bonded to the aryl group of the diaryl carbonate. The other reaction is a self-condensation reaction of a terminal aryl carbonate group with another terminal aryl carbonate group, by which polycondensation proceeds while releasing a diaryl carbonate.

It has been found that, in the temperature range for the solid-state polymerization, the reaction rate of the polycondensation which releases an aromatic monohydroxyl compound is generally from several times to several tens of times as high as the reaction rate of the polycondensation which releases a diaryl carbonate.

Therefore, according to the present invention (in which a crystallized prepolymer having terminal aryl carbonate groups in a specific amount, i.e., in an amount of greater than that of terminal hydroxyl groups, is subjected to solid-state polymerization), it is feasible to lower the amount of terminal hydroxyl groups significantly in the final aromatic polycarbonate having a desired molecular weight. The amount of terminal hydroxyl groups in the aromatic polycarbonate prepared by the method of the present invention depends upon the molecular weight of a crystallized prepolymer to be used; the amount of terminal aryl carbonate groups in a crystallized prepolymer to be used; the conditions for the solid-state polymerization, such as a solid-state polymerization temperature, a solid-state polymerization time and a solid-state polymerization method; and the molecular weight of the desired aromatic polycarbonate. However, the amount of terminal hydroxyl groups in the desired aromatic polycarbonate is generally not greater than 0.03% by weight, preferably not greater than 0.01% by weight, and more preferably not greater than 0.005% by weight, based on the weight of the desired aromatic polycarbonate. By the method of the present invention, an aromatic polycarbonate in which hydroxyl terminal groups are present in a small amount as mentioned above, is readily obtained.

This means that an aromatic polycarbonate (having excellent properties in which most or all of the terminal groups are stable aryl carbonate groups) is readily obtained by the method of the present invention.

In the solid-state polymerization, the polymerization reaction is accelerated by removing a by-produced aromatic monohydroxyl compound and/or a diaryl carbonate from the polymerization reaction system. For acceleration of the polymerization reaction, it is preferred to employ a method in which an inert gas, such as nitrogen, argon, helium or carbon dioxide; a lower hydrocarbon gas; or the like is introduced into the polymerization reaction system, so that the by-produced aromatic monohydroxyl compound and/or diaryl carbonate is entrained by the introduced gas and removed together from the polymerization reaction system, or a method in which the polymerization reaction is carried out under reduced pressure. These methods are optionally conducted in combination. In the case where an entraining gas is introduced into the polymerization reaction system, it is preferred to heat the gas preliminarily to around the polymerization reaction temperature.

There is no particular limitation with respect to the form of the crystallized prepolymer to be subjected to solid-state polymerization. However, when the crystallized prepolymer is a bulky mass, the polymerization reaction rate of the crystallized prepolymer is low and the handling of the crystallized prepolymer is difficult. Therefore, it is preferred to use a crystallized prepolymer in the form of a pellet, a bead, a granule, a powder or the like. Further, a crystallized prepolymer obtained by crashing a bulky crystallized prepolymer into pieces having appropriate sizes is also preferably employed. A crystallized prepolymer prepared by solvent treatment is generally in the form of a porous granule or powder. It is particularly preferred to use such a porous prepolymer because an aromatic monohydroxy compound and a diaryl carbonate, which are by-produced in the solid-state polymerization, can readily be removed from the polymerization reaction system.

The reaction temperature (Tp, °C.) and the reaction time for the solid-state polymerization vary depending upon the chemical structure, molecular weight, crystallinity, melting temperature (Tm', °C.) and form of the crystallized prepolymer; the presence or absence of a catalyst in the crystallized prepolymer; the type and amount of a catalyst, if any in the crystallized prepolymer; the type and amount of a catalyst if added to the polymerization system; the polymerization degree of the desired aromatic polycarbonate; and the like. But, the solid-state polymerization must be conducted at a temperature which is higher than the glass transition temperature of the crystallized prepolymer and at which the crystallized prepolymer is not melted but in a solid state. It is more preferred that the solid-state polymerization be conducted at a temperature (Tp, °C.) satisfying the following relationships:

$$Tm' - 50 \leq Tp < Tm' \tag{V}$$

wherein Tp and Tm' are as defined above.

The reaction time for the solid-state polymerization reaction is generally in the range of from one minute to 100 hours, preferably in the range of from 0.1 to 50 hours. For example, when a polycarbonate is prepared from bisphenol A, the temperature for the solid-state polymerization is in the range of from about 150° to about 260° C., preferably from about 180° to about 230° C.

The solid-state polymerization is advantageously conducted while stirring in order to heat the prepolymer uniformly and/or in order to facilitate the removal of by-products, such as an aromatic monohydroxy compound and a diaryl carbonate, from the polymerization reaction system. The stirring is optionally conducted by blowing a heated gas through the polymerization system or by mechanically stirring with, for example, a stirrer or a rotating reactor.

In the case of heat crystallization of a prepolymer, after the prepolymer has been crystallized to a desired crystallinity by heating, the system is, e.g., directly subjected to solid-state polymerization of the crystallized prepolymer while removing by-produced aromatic monohydroxy compound and diaryl carbonate from the polymerization reaction system by reducing the pressure of the polymerization reaction system or by introducing thereinto a heated gas for purging the by-products.

The solid-state polymerization is carried out at a satisfactory reaction rate without a catalyst. This is the most preferred mode of the present method. However, a catalyst may be added in order to accelerate the polymerization reaction rate. When a catalyst is used in the pre-polymerization step, since the catalyst generally remains in the resultant prepolymer, a further catalyst need not be added to the solid-state polymerization system. However, in the case where the catalyst is removed or inactivated in the course of the pre-polymerization and/or the crystallization of the prepolymer, an appropriate catalyst is optionally added to the solid-state polymerization reaction system. In this case, a catalyst in a liquid or gas form may be added to the prepolymer. As such a catalyst, the same types of catalysts as used in the pre-polymerization step, are useful. The amount of such a catalyst to be added is substantially the same as in the pre-polymerization step.

The crystallized prepolymer is converted by the solid-state polymerization to an aromatic polycarbonate having a desired degree of polymerization degree. An aromatic polycarbonate having a weight average molecular weight which is higher than that of the prepolymer obtained in step (1) is thus prepared. The weight average molecular weight of the aromatic polycarbonate which is practically useful is from about 6,000 to about 200,000, more preferably from about 10,000 to about 50,000, most preferably from about 15,000 to about 40,000. An aromatic polycarbonate having a weight average molecular weight in the above-mentioned range is readily obtained by the solid-state polymerization according to the present invention.

The form of the aromatic polycarbonate prepared by the solid-state polymerization in the present invention depends upon the form of the crystallized prepolymer. The aromatic polycarbonate is generally in a powdery, granular or bead form. The aromatic polycarbonate obtained by subjecting the crystallized prepolymer to solid-state polymerization generally has a crystallinity higher than that of the crystallized prepolymer. Therefore, the aromatic polycarbonate obtained by the method of the present invention is generally a crystallized polymer having a powdery or granular form.

The powdery or granular aromatic polycarbonate having a desired molecular weight formed in the solid-state polymerization, can be directly introduced, without cooling, into an extruder and pelletized, or can be directly introduced, without cooling, into a molding machine and molded.

According to the present invention, an aromatic polycarbonate having the desired weight average molecular weight is obtained through the steps of pre-polymerization and solid-state polymerization. In the present method, a prepolymer having a weight average molecular weight of from 2,000 to 20,000 is prepared in step (1), and an aromatic polycarbonate having a weight average molecular weight of from 6,000 to 200,000 is prepared in step (3). The ratio of the contribution of the pre-polymerization to the contribution of the solid-state polymerization toward attaining the desired weight average molecular weight is optionally varied.

In all the steps of the present method, i.e., the pre-polymerization, the crystallization of the prepolymer and the solid-state polymerization, the reaction is carried out in a batch-wise manner or in a continuous manner. Both manners may be employed in combination.

In the pre-polymerization step, since only a prepolymer having a relatively low molecular weight is prepared, there is no need to use an expensive reactor for handling a high viscosity fluid, such a reactor being needed in a melt polymerization conducted at high temperatures, for example, in the transesterification method known as melt process. In the crystallization step, since the prepolymer is crystallized simply by subjecting the prepolymer to solvent treatment or heat treatment, there is no need to employ any special devices. In the solid-state polymerization, the polymerization can be practiced in a simple device as long as the device is capable of heating the crystallized prepolymer and is capable of removing the by-products, i.e., an aromatic monohydroxyl compound and a diaryl carbonate.

As described above, the method of the present invention can be carried out using a simple device without any special means, and therefore the method of the present invention is practical and extremely advantageous.

According to the method of the present invention, a wide variety of aromatic polycarbonates, including aromatic polycarbonates having a broad molecular weight distribution and aromatic polycarbonates having a narrow molecular weight distribution, can be prepared. When a prepolymer having a narrow molecular weight distribution is used, an aromatic polycarbonate having a narrow molecular weight distribution can be obtained. On the other hand, when a prepolymer having a broad molecular weight distribution is used, an aromatic polycarbonate having a broad molecular weight distribution can be obtained. This is one of the remarkable features of the present invention. As a criterion of a molecular weight distribution, a ratio of a weight average molecular weight (Mw) to a number average molecular weight (Mn), i.e., Mw/Mn, is generally used. With respect to a polymer prepared by a condensation polymerization reaction, there has been established a theory that, when the Mw/Mn is 2, the polymer has the narrowest molecular weight distribution. A polymer having a narrow molecular weight distribution is generally preferred from the viewpoint of desired properties of the polymer, such as flowability in molding, mechanical strength and elongation. However, it is practically difficult to prepare a polymer having an Mw/Mn of not greater than 2.5, particularly not greater than 2.4. In conventional polymerization methods, such as the transesterification method which is known as a melt process, a polymerization reaction system becomes very viscous at the final stage of the polymerization reaction so that the polymerization reaction is likely to proceed in a non-uniform manner. According to this method, it is infeasible to obtain an aromatic polycarbonate having a narrow molecular weight distribution. The aromatic polycarbonate obtained by the conventional transesterification method generally has an Mw/Mn of more than 2.6. In the phosgene process carried out on a commercial scale, the obtained aromatic polycarbonate has an Mw/Mn of from 2.4 to 3.5, generally from 2.5 to 3.2. In contrast, an aromatic polycarbonate having an Mw/Mn as low as from 2.2 to 2.5 is readily prepared by the method of the present invention. The reason for this is believed to be that a polymer having a narrow molecular weight distribution can readily be obtained from the prepolymer having a relatively low molecular weight.

The crystallized aromatic polycarbonate of the present invention, for example a crystallized polycarbonate prepared using bisphenol A, (which is one of the most important polycarbonates to be prepared by the method of the present invention), is white and opaque. However, when this crystallized aromatic polycarbonate is heated at a temperature higher than its crystalline melting point or is subjected to melt molding, an amorphous aromatic polycarbonate having good transparency can be obtained. This is an important feature of the aromatic polycarbonate prepared by the method of the present invention. When an aromatic polycarbonate is prepared from bisphenol A and diphenyl carbonate by the conventional melt process, it is necessary to react the highly viscous raw materials with each other at a high temperature, i.e., about 300° C., under extremely reduced pressure, i.e., 1 mmHg or less, for a prolonged period of time. Consequently, the obtained polycarbonate inevitably has a light yellow color due to the thermal decomposition of the polymer or due to the oxidation of the polymer by the oxygen present in a small amount. In contrast, in the present invention, not only can the pre-polymerization step be performed at a relatively low temperature, i.e., 250° C. or less, preferably 240° C. or less, in a short period of time, but also both the crystallization step and the solid-state polymerization step can be performed at a relatively low temperature, i.e., 230° C. or less. Consequently, in the method of the present invention, there is no danger of deteriorating the polymer, as in the conventional melt process, such as the transesterification method. Therefore, the crystallized polycarbonate obtained by the solid-state polymerization in the present invention is not yellowish, but white. When this polycarbonate is heated at a temperature higher than the melting temperature of the polymer, the crystallized polymer is readily converted to an amorphous polymer which is a colorless, transparent polycarbonate of bisphenol A type.

By the method of the present invention, various types of high molecular weight aromatic polycarbonates [having a skeleton derived from a dihydroxydiaryl compound comprising from 85 to 100 mole % of a dihydroxydiaryl alkane represented by formula (I) and from 0 to 15 mole % of a dihydroxydiaryl derivative]are readily produced. Of these aromatic polycarbonates, a powdery or granular crystallized aromatic polycarbonate having a weight average molecular weight (Mw) of from 6,000 to 200,000 and having a terminal hydroxyl group content of not greater than 0.03% by weight can easily be molded through pelletization or directly molded without pelletizing to provide a molded article of an aromatic polycarbonate having excellent properties. Moreover, the powdery or granular crystallized aromatic polycarbonate obtained by the present invention can be readily kneaded with another polymer in order to form a polymer alloy. Therefore, the powdery or granular crystallized aromatic polycarbonate is particularly important as a raw material for the production of a polymer alloy on a commercial scale.

A powdery or granular aromatic polycarbonate containing no chlorine atoms can be obtained from a dihydroxydiaryl compound containing no chlorine atoms and a diarylcarbonate containing no chlorine atoms. The powdery aromatic polycarbonate containing no chlorine atoms is particularly important as a material for an optical instrument and a material for electronic equipment.

BEST MODE FOR CARRYING OUT THE INVENTION

The present invention will be described in more detail with reference to the following Examples, which should not be construed as limiting the scope of the present invention.

Incidentally, the molecular weight is expressed in terms of a weight average molecular weight (Mw) as measured by gel permeation chromatography (GPC). The calibration curve for the GPC is one prepared using standard polystyrene. The ratio of the weight average molecular weight to the number average molecular weight (Mn) (Mw/Mn) is also expressed in terms of a value as obtained through measurements by GPC. With respect to the reactors for the pre-polymerization and for the solid-state polymerization, attention was drawn to deoxidation and drying of the reactors before use. Also, attention was drawn so as to choose reactors capable of preventing either oxygen or water from entering the reactors during the reactions.

The ratio of the amount of terminal aryl carbonate groups to the amount of terminal hydroxyl groups in each of the prepolymer and aromatic polycarbonate was determined by high-performance liquid chromatography and by a method of A. Horbach et al [which is a method for determining the amount of phenolic hydroxyl group, in which a prepolymer or polymer is dissolved in an acetic acid-acidified methylene chloride and TiCl4 is then added so as to form a red complex, and then the amount of the red complex is determined by colorimetry at a wave length of 546 nm; see Makromol. Chem., 88, 215 (1965)]. The crystallinity was determined according to the method utilizing the powder X-ray diffraction patterns of an amorphous prepolymer and a crystallized prepolymer, as described hereinbefore.

EXAMPLE 1

68.4 g of 2,2-bis(4-hydroxyphenyl)propane (hereinafter referred to as "bisphenol A") and 77.0 g of diphenyl carbonate were put into a 500 ml three-necked flask provided with a stirrer, a gas inlet and a gas suction port. Deaeration by applying vacuum and introduction of dry nitrogen were performed five to six times. Then, the flask was immersed in an oil bath kept at from 180° to 190° C., thereby melting the content of the flask. Again, deaeration by applying vacuum and introduction of dry nitrogen were performed. Thereafter, the temperature of the oil bath was elevated up to 230° C., and dry nitrogen was introduced into the flask at a rate of 25 l/hr (volume at normal temperature and pressure) while stirring so as to distill off formed phenol. About 50 minutes later, the reaction system was evacuated, and the reaction mixture was stirred at from 2 to 5 mmHg for about 15 minutes, thereby distilling off phenol and diphenyl carbonate. As a result, there was obtained 76 g of a colorless, transparent prepolymer having a weight average molecular weight of 6,200. The prepolymer had terminal groups of the formula

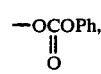

wherein Ph represents a phenyl group, and terminal —OH groups in amounts of 72 mole % and 28 mole %, respectively, based on the total number of moles of all the terminal groups of the prepolymer.

The prepolymer was taken out of the flask and pulverized. The resultant powdery prepolymer was immersed in 250 ml of acetone, thereby effecting crystallization of the prepolymer. The crystallization of the prepolymer occurred immediately after the immersion. 30 Minutes after the immersion, sufficient crystallinity was obtained, but immersion was further continued for 1 hour. The resultant white powdery crystallized prepolymer was filtered off and dried. The powder X-ray diffraction patterns of the prepolymer before and after the crystallization are shown in FIG. 1 and FIG. 2, respectively. From the powder X-ray diffraction patterns, it has been found that the crystallized prepolymer had a crystallinity of 30 %. With respect to the ratio of each of the terminal groups, there was substantially no change between the prepolymer before the crystallization, i.e., amorphous prepolymer, and that after crystallization, i.e., crystallized prepolymer.

The powdery crystallized prepolymer, the crystallinity of which was obtained using FIGS. 1 and 2 by the above-mentioned method and found to be about 30%, was put into the same flask as that used in the prepolymer preparation. While introducing a little amount of dry nitrogen into the flask which was under 2 to 5 mmHg, the flask was put in an oil bath kept at 190° C. While stirring the content of the flask, the temperature of the oil bath was elevated at a rate of 5° C./hr. After the temperature of the oil bath reached 220° C., stirring of the content of the flask was continued at this temperature for 8 hours under a reduced pressure of 2 to 5 mmHg while introducing a little amount of dry nitrogen, thereby effecting solid-state polymerization. As a result, there was obtained a white powdery crystallized polycarbonate having a weight average molecular weight of 28,000 (Mw/Mn=2.4). The thus obtained crystallized polycarbonate had a hydroxyl terminal group content of 0.001 % by weight, based on the weight of the polymer. In contrast, with respect to commercially available polycarbonates, the content of terminal hydroxyl groups is in the range of from about 0.01 to 0.05% by weight.

Test pieces were obtained by subjecting the white crystallized polycarbonate to customary injection molding. The testing pieces were colorless, transparent and tough. The test pieces were subjected to testing for boiling water resistance by putting in an autoclave containing water and heating at 120° C. for 50 hours. As a result, although the weight average molecular weight had been slightly reduced to 25,000, no occurrence of crazing or discloration was observed.

COMPARATIVE EXAMPLE 1

Substantially the same procedure for producing a prepolymer as in Example 1 was repeated. That is, a reaction was conducted at 230° C. for about 50 min under agitation while introducing dry nitrogen at a rate of 25 l/hr (volume at normal temperature and pressure). The reaction system was then evacuated to 2 to 5 mmHg and a reaction was further conducted for about 15 minutes. The temperature was elevated to 280° C., at which a reaction was further conducted under 1 mmHg for 1 hour, and then reaction was still further conducted at 300° C. and 1 mmHg for 3 hours. After cooling the reaction system, there was obtained an amorphous polycarbonate having a weight average molecular weight of 26,000 (Mw/Mn=2.8). The polycarbonate was slightly yellowish and had a hydroxyl terminal group content of 0.08% by weight based on the weight of the polymer.

Test pieces obtained by customary injection molding of the above-obtained polycarbonate were subjected to testing for boiling water resistance in the same manner as in Example 1. As a result, not only the weight average molecular weight was reduced to 18,000 but also occurrence of some crazing was observed, and the yellowish color was thickened.

EXAMPLES 2 TO 7 AND COMPARATIVE EXAMPLES 2 to 3

11.4 Kg of bisphenol A and 11.6 Kg of diphenyl carbonate were put into a 25 l glass-lined reactor. Deaeration by applying vacuum and introduction of dry nitrogen were repeated five to six times. Subsequently, the reactor was heated up to 180° to 190° C., thereby melting the content of the reactor. Again, deaeration by applying vacuum and introduction of dry nitrogen were repeated five to six times. The internal temperature of the content of the reactor was elevated to from 230° to 235° C. and dry nitrogen was introduced into the reactor at a rate of 200 l/hr (volume at normal temperature and pressure) for 2 hours while stirring. The reaction system was evacuated, and then a reaction was conducted at from 5 to 10 mmHg for 2 hours, thereby distilling off phenol which contained diphenyl carbonate. Thereafter, the prepolymer formed was discharged from the lower part of the reactor into a nitrogen atmosphere by pressurizing the reactor to 2 to 3 Kg/cm² with dry nitrogen. The thus obtained prepolymer was colorless and transparent and had a weight average molecular weight of 6,000 and had terminal groups of the formula

in an amount of 70 mole %, based on the total number of moles of all the terminal groups of the prepolymer.

The prepolymer was pulverized, and using 100 g each of the pulverized prepolymer, crystallized prepolymers having various crystallinities were obtained in substantially the same manner as in Example 1. Then, the crystallized prepolymers were individually subjected to solid-state polymerization in substantially the same manner as in Example 1. At the solid-state polymerization in each of Example 2 and Comparative Example 2, the employed temperature profile was such that the reaction temperature was kept at 180° C. for 5 hours and then elevated to 210° C. at a rate of 5° C./hr, and the temperature of 210° C. was kept for 10 hours. The results of the solid-state polymerization are shown in Table 1. In Comparative Example 2, fusion of the pulverized prepolymer occurred during the solid-state polymerization to such a degree that the polymerization could not be continued. In Example 2, although a portion of the prepolymer fused, solid-state polymerization could be completed.

TABLE 1

| | Crystallinity (%) | Mw | Mw/Mn |
|---|---|---|---|
| Example 2 | 5 | 19,000 | 2.48 |
| Example 3 | 10 | 21,100 | 2.44 |

TABLE 1-continued

| | Crystallinity (%) | Mw | Mw/Mn |
|---|---|---|---|
| Example 4 | 19 | 26,300 | 2.35 |
| Example 5 | 33 | 27,000 | 2.33 |
| Example 6 | 45 | 20,800 | 2.36 |
| Example 7 | 55 | 11,000 | 2.28 |
| Comparative Example 2 | 3 | Solid-state polymerization could not be performed due to occurrence of fusion | |
| Comparative Example 3 | 59 | 8,200 | 1.86 |

Comparative Example 3 shows that in forming a prepolymer having a crystallinity of more than 55%, the solid-state polymerization speed is extremely low.

Prepolymers having a crystallinity of 19% or less were produced by keeping an amorphous prepolymer in acetone-saturated vapor, and prepolymers having a crystallinity of 45% or more were produced by keeping a crystallized prepolymer having a crystallinity of 33% (obtained by immersion of an amorphous prepolymer in acetone) in a nitrogen atmosphere at 190° C. for a predetermined period of time (30 hours for Example 6 and 50 hours for Example 7).

The amorphous prepolymers in these Examples and Comparative Examples were completely amorphous and were obtained by discharging into a nitrogen atmosphere at room temperature. With respect to amorphous prepolymers before crystallization, the amorphous nature was confirmed as follows. The powder X-ray diffraction patterns of the amorphous prepolymers were compared with that (FIG. 3) of a powder of completely amorphous prepolymer, as obtained by fusing a prepolymer at 280° C. and then quickly cooling it in ice water, thereby confirming that the patterns were identical. The X-ray diffraction pattern of the powdery crystallized prepolymer having a crystallinity of 33% obtained in Example 5 is shown in FIG. 4.

EXAMPLE 8

Substantially the same procedure for producing an amorphous prepolymer as in Example 1 was repeated to obtain an amorphous prepolymer having a weight average molecular weight of 6,200 and having terminal groups of the formula

in an amount of 71 mole %. Then, the oil bath temperature was lowered to 180° C., and the flask containing the amorphous prepolymer in a dry nitrogen atmosphere under atmospheric pressure was allowed to stand in the oil bath for 36 hours, thereby effecting crystallization of the prepolymer. As a result, there was obtained a crystallized prepolymer having a crystallinity of about 17%. The crystallized prepolymer was taken out of the flask and pulverized. The resultant powdery prepolymer was subjected to solid-state polymerization in the same manner as in Example 1, thereby obtaining a white powdery crystallized polycarbonate having a weight average molecular weight of 25,500 (Mw/Mn=2.35) and a hydroxyl terminal group content of 0.002% by weight, based on the weight of the polymer.

Further, when test pieces obtained by injection molding the above obtained polycarbonate was subjected to the same testing for boiling water resistance as in Example 1, although the weight average molecular weight was slightly reduced to 23,000, no occurrence of crazing or discoloration was observed.

EXAMPLE 9

Substantially the same procedure for producing an amorphous prepolymer as in Example 1 was repeated, except that 68.4 g of bisphenol A and 90 g of diphenyl carbonate were employed, to obtain a colorless, transparent prepolymer having a weight average molecular weight of 4,000. The prepolymer was pulverized and then immersed in methyl ethyl ketone, thereby effecting crystallization of the prepolymer. The resultant crystallized prepolymer had a crystallinity of about 28% and had terminal groups of the formula

wherein Ph represents a phenyl group, and terminal —OH groups in amounts of 95 mole % and 5 mole %, respectively, based on the total number of moles of all the terminal groups of the prepolymer.

The crystallized prepolymer was subjected to solid-state polymerization in substantially the same manner as in Example 1, except that the reaction at 220° C. was conducted for 20 hours. As a result, there was obtained a white powdery crystallized polycarbonate having a weight average molecular weight of 21,000 (Mw/Mn=2.2). With respect to the polycarbonate, substantially no terminal hydroxyl groups were detected.

EXAMPLE 10

Substantially the same procedure for producing an amorphous prepolymer as in Example 1 was repeated except that 68.4 g of bisphenol A and 70.6 g of diphenyl carbonate were employed, to obtain a colorless, transparent prepolymer having a weight average molecular weight of 8,100 (Mw/Mn=1.82). The prepolymer (at 230° C.) was discharged from the nozzle at the lower part of the flask into a 1 l flask provided with an agitating element and containing 500 ml of acetone, followed by agitation, thereby effecting crystallization and pulverization simultaneously. The resultant crystallized prepolymer had a crystallinity of 31% and had phenyl carbonate terminal groups

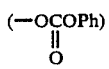

in an amount of 62 mole %, based on the total number of moles of all the terminal groups of the prepolymer.

The resultant powdery crystallized prepolymer was subjected to solid-state polymerization in the same manner as in Example 1, thereby obtaining a white powdery crystallized polycarbonate having a weight average molecular weight of 32,000 (Mw/Mn=2.45) and having a terminal hydroxyl group content of 0.002% by weight, based on the weight of the polymer.

EXAMPLE 11

Substantially the same procedures for producing an amorphous prepolymer and for crystallization of the prepolymer as in Example 1 were repeated, except that 68.4 g of bisphenol A and 67.5 g of diphenyl carbonate were employed and that the time for reaction under vacuum in the amorphous prepolymer production was changed to about 10 minutes, thereby obtaining a crystallized prepolymer having a weight average molecular weight of 2,300 (Mw/Mn=1.5), a crystallinity of 35% and terminal phenyl carbonate groups in an amount of 52 mole %, based on the total number of moles of all the terminal groups of the prepolymer.

The crystallized prepolymer was pulverized and subjected to solid-state polymerization in substantially the same manner as in Example 1, except that reaction was conducted at 190° C. for 4 hours and then at 200° C. for 4 hours and then at 210° C. for 4 hours, thereby obtaining a white powdery crystallized polycarbonate having a weight average molecular weight of 25,000 (Mw/Mn=2.33). The polycarbonate had a terminal hydroxyl group content of 0.02% by weight, based on the weight, of the polymer.

EXAMPLE 12

Substantially the same procedures for producing an amorphous prepolymer and for crystallization of the prepolymer as in Example 1 were repeated, except that 68.4 g of bisphenol A and 68.5 g of diphenyl carbonate were employed and that the time for reaction under vacuum in the amorphous prepolymer production was changed to about 20 minutes, thereby obtaining a crystallized prepolymer having a weight average molecular weight of 7,800, a crystallinity of 31% and phenyl carbonate terminal groups in an amount of 58 mole %, based on the total number of moles of all the terminal groups of the prepolymer.

The crystallized prepolymer was pulverized and subjected to solid-state polymerization in substantially the same manner as in Example 1, except that the reaction temperature was elevated from 190° C. to 220° C. at a rate of 6° C./hr and kept at 220° C. for 5 hours, thereby obtaining a white powdery crystallized polycarbonate having a weight average molecular weight, of 75,000 (Mw/Mn=3.0). The polycarbonate had a terminal hydroxyl group content of 0.003% by weight, based on the weight of the polymer.

COMPARATIVE EXAMPLE 4

Substantially the same procedures for producing an amorphous prepolymer and for crystallization of the prepolymer as in Example 1 were repeated, except that 68.4 g of bisphenol A and 65.4 g of diphenyl carbonate were employed, thereby obtaining a crystallized prepolymer having a weight average molecular weight of 3,500, a crystallinity of 38% and terminal phenyl carbonate groups in an amount of 40 mole %, based on the total number of moles of all the terminal groups of the prepolymer.

The crystallized prepolymer was pulverized and subjected to solid-state polymerization in substantially the same manner as in Example 1, except that reaction was conducted at 220° C. for 12 hours, thereby obtaining a powdery crystallized polycarbonate having a weight average molecular weight of 11,000 (Mw/Mn=1.9). The polycarbonate had a terminal hydroxyl group content as high as 80% by weight, based on the weight of the polymer. Moreover, the polymer was discolored in a slight yellowish color.

EXAMPLE 13

Substantially the same procedure for producing an amorphous prepolymer as in Example 1 was repeated, except that distilling-off of phenol formed was conducted at 250° C. under a stream of dry nitrogen, and the reaction system was stirred at 2 to 5 mmHg for about 30 minutes, thereby distilling off phenol and diphenyl carbonate. As a result, there was obtained a colorless, transparent prepolymer having a weight average molecular weight of 15,000. The prepolymer was dissolved in methylene chloride for effecting crystallization and then the methylene chloride was distilled off, thereby obtaining a white crystallized prepolymer having a crystallinity of 35% and terminal phenyl carbonate groups in an amount of 80 mole %, based on the total number of moles of all the terminal groups of the prepolymer.

The crystallized prepolymer was pulverized and subjected to solid-state polymerization in the same manner as in Example 1, thereby obtaining a white powdery crystallized polycarbonate having a weight average molecular weight of 38,800 (Mw/Mn=2.65). With respect to the polycarbonate, substantially no terminal hydroxyl groups were detected.

EXAMPLE 14

Substantially the same procedure for producing an amorphous prepolymer as in Example 1 was repeated, except that the time for stirring at 2 to 5 mmHg was changed to about 5 minutes, thereby obtaining a colorless, transparent prepolymer having a weight average molecular weight of 2,900. The thus obtained prepolymer was immersed in tetrahydrofuran, thereby effecting crystallization of the prepolymer. After distilling off the tetrahydrofuran, there was obtained a powdery crystallized prepolymer having a crystallinity of 26% and having terminal phenyl carbonate groups in an amount of 60 mole %, based on the total number of moles of all the terminal groups of the prepolymer.

The powdery crystallized prepolymer was subjected to solid-state polymerization in the same manner as in Example 1, thereby obtaining a white powdery crystallized polycarbonate having a weight average molecular weight of 21,000 (Mw/Mn=2.23) and a terminal hydroxyl group content of 0.008% by weight, based on the weight of the polymer.

EXAMPLE 15

0.5 g of sodium methoxide was added to 1 kg of bisphenol A and the resultant mixture was fused while stirring uniformly, to obtain a catalyst mixture.

Substantially the same procedure for producing an amorphous prepolymer as in Example 1 was repeated, except that 0.5 g of the above-obtained catalyst mixture, 68.4 g of bisphenol A and 77.0 g of diphenyl carbonate were employed, thereby obtaining a colorless, transparent prepolymer having a weight average molecular weight of 8,800. The prepolymer was allowed to stand at from 160° C. to 180° C. for 15 hours, thereby effecting heat crystallization of the prepolymer. The resultant crystallized prepolymer had a crystallinity of 36% and had terminal phenyl carbonate groups in an amount of 75 mole %, based on the total number of moles of all the terminal groups of the prepolymer. The crystallized prepolymer was pulverized and then subjected to solid-state polymerization in the same manner as in Example 1, thereby obtaining a white powdery crystallized polycarbonate having a weight average molecular weight of 31,000 (Mw/Mn=2.3). The polycarbonate had a terminal hydroxyl group content of 0.005% by weight.

EXAMPLE 16

Substantially the same procedure for producing an amorphous prepolymer as in Example 1 was repeated, except that 68.4 g of bisphenol A and 78.5 g of di-p-tolylcarbonate were employed, thereby obtaining a colorless, transparent prepolymer having a weight average molecular weight of 6,000.

The prepolymer was pulverized and charged in a flask, and acetone vapor was then introduced into the flask, thereby effecting crystallization of the prepolymer. The resultant crystallized prepolymer had a crystallinity of 27% and terminal groups of the formula

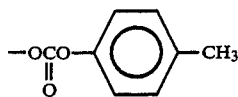

in an amount of 58 mole %, based on the total number of moles of all the terminal groups of the prepolymer. The crystallized prepolymer was subjected to solid-state polymerization in the same manner as in Example 1, except that the vacuum employed was 1 to 2 mmHg, thereby obtaining a white powdery crystallized polycarbonate having a weight average molecular weight of 26,000 (Mw/Mn=2.3). The polycarbonate had a terminal hydroxyl group content of 0.003% by weight.

EXAMPLE 17

Substantially the same procedures for producing an amorphous prepolymer and for crystallization of the prepolymer as in Example 1 were repeated, except that 80.4 g of 1,1-bis(4-hydroxyphenyl)cyclohexane and 70.7 g of diphenyl carbonate and that the reaction temperature for the amorphous prepolymer production was 240° C., thereby obtaining a crystallized prepolymer having a weight average molecular weight of 8,500 and a crystallinity of 26% and having terminal phenyl carbonate groups in an amount of 80 mole %, based on the total number of moles of all the terminal groups of the prepolymer.

The powdery crystallized prepolymer was put into the same flask as that used in Example 1. While introducing a little amount of dry nitrogen into the flask which was under 2 to 5 mmHg, the flask was put in an oil bath kept at 190° C. While stirring the content of the flask, the temperature of the oil bath was elevated at a rate of 5° C./hr. After the temperature of the oil bath reached 235° C., stirring of the content of the flask was continued at this temperature for 4 hours under a reduced pressure of 2 to 5 mmHg while introducing a little amount of dry nitrogen, thereby effecting solid-state polymerization. As a result, there was obtained a white powdery crystallized polycarbonate having a weight average molecular weight of 29,000 (Mw/Mn=2.44). The thus obtained crystallized polycarbonate had a terminal hydroxyl group content of 0.004% by weight, based on the weight of the polymer.

EXAMPLE 18

Substantially the same procedures for producing amorphous prepolymer and for crystallization of the prepolymer as in Example 1 were repeated, except that 85.2 g of 2,2-bis(3,5-dimethyl-4-hydroxyphenyl)propane and 77.0 g of diphenyl carbonate were employed, thereby obtaining a white crystallized prepolymer having a weight average molecular weight of 5,800 and a crystallinity of 25% and containing terminal phenyl carbonate groups in an amount of 70% by mole, based on the moles of all the terminal groups of the prepolymer.

The crystallized prepolymer was pulverized and subjected to solid-state polymerization in substantially the same manner as in Example 1, thereby obtaining a white powdery crystallized polycarbonate having a weight average molecular weight of 28,000 (Mw/Mn=2.40). The polycarbonate had a terminal hydroxyl group content of 0.005% by weight, based on the weight of the polymer.

EXAMPLE 19

Substantially the same procedures for producing an amorphous prepolymer and for crystallization of the prepolymer as in Example 1 were repeated, except that 68.4 g of bisphenol A, 8.16 g of 2,2-bis(3,5-dibromo-4-hydroxyphenyl)propane and 80 g of diphenyl carbonate were employed, thereby obtaining a crystallized prepolymer having a weight average molecular weight of 6,800 and a crystallinity of 29% and having terminal phenyl carbonate groups in an amount of 73 mole %, based on the total number of moles of all the terminal groups of the prepolymer.

The crystallized prepolymer was pulverized and subjected to solid-state polymerization in substantially the same manner as in Example 1, thereby obtaining a random copolycarbonate having a weight average molecular weight of 29,000 (Mw/Mn=2.3) and containing two types of units respectively represented by the following formulae (A) and (B) in a molar ratio of approximately 95/5:

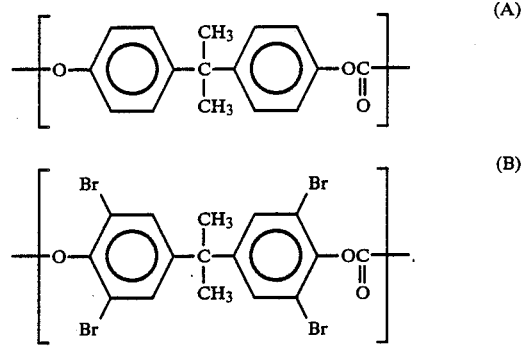

The copolycarbonate had a terminal hydroxyl group content of 0.008% by weight, based on the weight of the polymer.

EXAMPLE 20

Substantially the same procedures for producing an amorphous prepolymer and for crystallization of the prepolymer as in Example 1 were repeated, except that 68.4 g of bisphenol A, 9.09 g (0.045 mole) of 4,4'-dihydroxyphenyl ether and 80 g of diphenyl carbonate were employed, thereby obtaining a crystallized prepolymer having a weight average molecular weight of 7,300 and a crystallinity of 27% and having terminal phenyl carbonate groups in an amount of 75 mole %, based on the total number of moles of all the terminal groups of the prepolymer.

The crystallized prepolymer was pulverized and subjected to solid-state polymerization in substantially the same manner as in Example 1, thereby obtaining a powdery crystallized random copolycarbonate having a weight average molecular weight of 28,500 (Mw/Mn=2.36) and containing two types of units respectively represented by the following formulae (A) and (C) in a molar ratio of approximately 86/14:

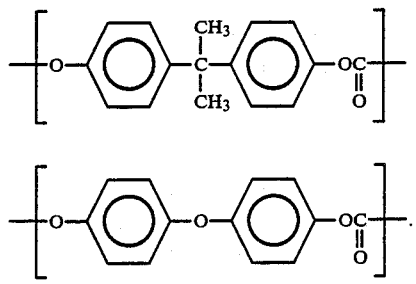

The copolycarbonate had a terminal hydroxyl group content of 0.005% by weight, based on the weight of the polymer.

EXAMPLES 21 to 24

Substantially the same procedures for producing an amorphous prepolymer and for crystallization of the prepolymer as in Example 1 were repeated, except that 68.4 g (0.3 mole) of bisphenol A, 80 g (0.37 mole) of diphenyl carbonate and 0.033 mole of each of the dihydroxyl diaryl compounds indicated in Table 2 were employed. The results are shown in Table 2.

With respect to all of the resultant crystallized prepolymers, the crystallinity was in the range of from 20 to 38% and the content of terminal phenyl carbonate groups was in the range of from 60 to 80 mole %. Further, all of the resultant powdery crystallized copolycarbonates comprised about 90% of bisphenol A as skeleton.

TABLE 2

| Example Nos. | Dihydroxy diaryl compound | Weight average molecular weight (Mw) Prepolymer | After solid-state polymerization |
|---|---|---|---|
| 21 | HO—⟨◯⟩—S—⟨◯⟩—OH | 5,900 | 28,300 |
| 22 | HO—⟨◯⟩—SO₂—⟨◯⟩—OH | 6,300 | 29,500 |
| 23 | HO—⟨◯(CH₃)⟩—C(=O)—⟨◯(CH₃)⟩—OH (with CH₃ groups) | 5,200 | 26,400 |
| 24 | HO—⟨◯⟩—C(=O)—⟨◯⟩—OH | 6,800 | 30,200 |

EXAMPLE 25

Substantially the same procedures for producing an amorphous prepolymer and for crystallization of the prepolymer as in Example 1 were repeated, except that 68.4 g (0.3 mole) of bisphenol A, 0.15 g of tri-(4-hydroxyphenyl)-phenylmethane and 77.0 g of diphenyl carbonate were employed, thereby obtaining a crystallized prepolymer having a weight average molecular weight of 6,500 and a crystallinity of 28% and containing terminal phenyl carbonate groups in an amount of 70 mole %, based on the total number of moles of the whole terminal groups of the prepolymer.

The crystallized prepolymer was pulverized and subjected to solid-state polymerization in substantially the same manner as in Example 1, thereby obtaining a powdery crystallized aromatic polycarbonate having a weight average molecular weight of 33,000 (Mw/Mn=3.2). The polycarbonate had a terminal hydroxyl group content of 0.002% by weight based on the weight of the polymer.

It is noted that the aromatic polycarbonates obtained in Examples described above contained substantially no chlorine atoms.

BRIEF DESCRIPTION OF THE DRAWINGS

FIGS. 1 and 2 respectively show the powder X-ray diffraction patterns of the prepolymers before and after crystallization, as obtained in Example 1; and FIGS. 3 and 4 respectively show the powder X-ray diffraction patterns of the prepolymers before and after crystallization, as obtained in Example 5.

INDUSTRIAL APPLICABILITY

In the conventional phosgene process for producing an aromatic polycarbonate on a commercial scale, by-products including electrolytes, such as sodium chloride, and chlorine are formed as impurities; these impurities are disadvantageously and inevitably contained in the final resin. Further, a chlorine-containing compound, such as methylene chloride, which is used as a solvent in a large amount, is also likely to be contained as an impurity in the resin. Such impurities adversely affect the properties of resin in which they are present. Conventionally, in order to decrease the amount of impurities contained in the resin, washing and other operations have been conducted. However, these are troublesome and expensive, and it is infeasible to remove impurities completely from the resin.

By contrast, the aromatic polycarbonate produced according to the present invention does not contain such impurities. Further, the amount of unstable terminal groups (OH groups) in the aromatic polycarbonate is small, and the aromatic polycarbonate is colorless and has excellent properties, such as excellent resistance to heat and boiling water. Moreover, naturally, any troublesome process for removing impurities from the resin is not required. Accordingly, the method of the present invention is commercially advantageous.

Further, in the transesterification melt process, which is another conventional method, an expensive high viscosity reactor is disadvantageously required for attaining a high temperature and a high degree of vacuum; due to the high temperature, the polymer is likely to be deteriorated and yellowing of the polymer is likely to occur. By contrast, according to the method of the present invention, such a special reactor is not required, and the aromatic polycarbonate produced by the pres-

We claim:

1. A method for producing a crystallized aromatic polycarbonate which comprises the steps of:
   (1) heating a mixture of a dihydroxydiaryl compound and a diaryl carbonate at a temperature sufficient and for a period of time sufficient to prepare a prepolymer having a weight average molecular weight of from 2,000 to 20,000 and having terminal aryl carbonate groups,
   said dihydroxydiaryl compound comprising from 85 to 100 mole % of a dihydroxydiaryl alkane represented by the formula:

$$HO-Ar^1-Y-Ar^2-OH \qquad (I)$$

wherein each of $Ar^1$ and $Ar^2$ independently represents a divalent carbocyclic or heterocyclic aromatic group, and Y represents a divalent alkane group,
   and from 0 to 15 mole % of a dihydroxydiaryl derivative other than said dihydroxydiaryl alkane,
   said terminal aryl carbonate groups being present in an amount of greater than 50 mole %, based on the total number of moles of all the terminal groups of the prepolymer;
   (2) crystallizing said prepolymer to a crystallinity of from 5 to 55%; and
   (3) heating the crystallized prepolymer at a temperature which is higher than the glass transition temperature of said crystallized prepolymer and at which said crystallized prepolymer is in a solid state, thereby increasing the weight average molecular weight of the crystallized prepolymer to from 6,000 to 200,000 so that the resultant polymer has a weight average molecular weight which is greater than that of said prepolymer obtained in step (1).

2. A method according to claim 1, wherein the heating of the mixture in step (1) is performed in the absence of a catalyst.

3. A method according to claim 1, wherein the heating of the crystallized prepolymer in step (3) is performed in the absence of a catalyst.

4. A method according to claim 1, wherein both the heating in step (1) and the heating in step (3) are performed in the absence of a catalyst.

5. A method according to claim 1, wherein the heating in step (1) is performed at a temperature at which said dihydroxydiaryl compound and said diaryl carbonate are in a molten state.

6. A method according to claim 5, wherein the heating in step (1) is performed at a temperature of from 150° to 280° C.

7. A method according to claim 1, wherein the amount (x, mole %) of terminal aryl carbonate groups relative to the total number of moles of all the terminal groups of the prepolymer and the weight average molecular weight (Mw) of the prepolymer satisfy the following relationships:

when $2,000 \leq Mw \leq 5,000$, $50 < x \leq 100$; and
   when $5,000 < Mw \leq 20,000$, $0.002\,Mw + 40 \leq x \leq 100$.

8. A method according to claim 1, wherein said crystallinity is in the range of from 10 to 45%.

9. A method according to claim 1, wherein said crystallization in step (2) is performed by solvent treatment.

10. A method according to claim 9, wherein said solvent treatment comprises dissolving the prepolymer in a solvent and removing the solvent from the resultant solution.

11. A method according to claim 9, wherein said solvent treatment comprises contacting the prepolymer with a liquid or vaporized poor solvent for the prepolymer for a period of time sufficient to allow the solvent to permeate thereinto, causing the prepolymer to be crystallized.

12. A method according to claim 1, wherein said crystallization in step (2) is performed by heating the prepolymer at a temperature sufficient to crystallize the prepolymer.

13. A method according to claim 1, wherein each divalent aromatic group independently has from 5 to 30 carbon atoms, and said divalent alkane group has from 1 to 30 carbon atoms.

14. A method according to claim 13, wherein each divalent aromatic group is independently a member selected from the group consisting of a phenylene group, a naphthylene group, a biphenylene group and a pyridylene group, each of which is unsubstituted or substituted with at least one member selected from the group consisting of a halogen atom, a lower alkyl group, a lower alkoxy group, a phenyl group, a phenoxy group, a vinyl group, a cyano group, an ester group, an amide group and a nitro group; and wherein said divalent alkane group is a group represented by one of the formulae:

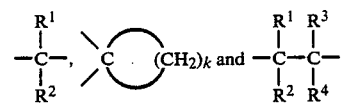

wherein each of $R^1$, $R^2$, $R^3$ and $R^4$ independently represents a hydrogen atom, a lower alkyl group, a lower alkoxy group, a cycloalkyl group having from 5 to 10 ring carbon atoms, a carbocyclic aromatic group having from 5 to 10 ring carbon atoms or a carbocyclic aralkyl group having from 6 to 10 carbon atoms, and k is an integer of from 3 to 11, inclusive.

15. A method according to claim 14, wherein said dihydroxydiaryl alkane is 2,2-bis(4-hydroxyphenyl)propane.

16. A method according to claim 1, wherein said dihydroxydiaryl derivative other than said dihydroxydiaryl alkane is a compound represented by the formula:

$$HO-Ar^1-Z-Ar^2-OH \qquad (II)$$

wherein each of $Ar^1$ and $Ar^2$ independently represents a divalent carbocyclic or heterocyclic aromatic group, and Z represents a bond, $-O-$, $-CO-$, $-S-$, $-SO-$, $-SO_2-$, or $-CON(R^1)-$
wherein $R^1$ represents a hydrogen atom, a lower alkyl group, a lower alkoxy group, a cycloalkyl group having from 5 to 10 ring carbon atoms, a carbocyclic aromatic group having from 5 to 10 ring carbon atoms or a carbocyclic aralkyl group having from 6 to 10 carbon atoms.

17. A method according to claim 16, wherein said dihydroxydiaryl derivative is a compound of one of the formulae:

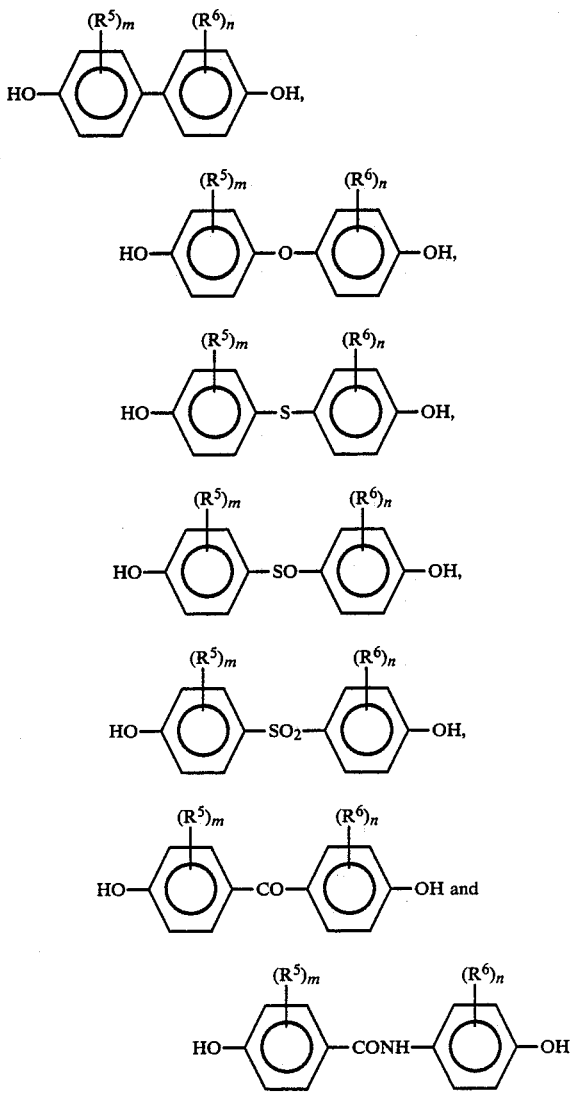

wherein each of $R^5$ and $R^6$ independently represents a hydrogen atom, a halogen atom, an alkyl group having from 1 to 4 carbon atoms, an alkoxy group having from 1 to 4 carbon atoms, a cycloalkyl group having from 5 to 10 ring carbon atoms or a phenyl group; each of m and n independently represents an integer of from 1 to 4; when m is an integer of from 2 to 4, each $R^5$ may be the same or different; and when n is an integer of from 2 to 4, each $R^6$ may be the same or different.

18. A method according to claim 1, wherein said diaryl carbonate is a compound represented by the formula:

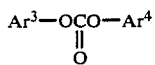

wherein each of $Ar^3$ and $Ar^4$ independently represents a monovalent carbocyclic or heterocyclic aromatic group.

19. A method according to claim 18, wherein said diaryl carbonate is a compound represented by the formula:

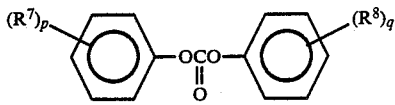

wherein each of $R^7$ and $R^8$ independently represents a hydrogen atom, a halogen atom, a lower alkyl group, a lower alkoxy group, a cycloalkyl group having from 5 to 10 ring carbon atoms or a phenyl group; and each of p and q independently represents an integer of from 1 to 5; with the proviso that when p is an integer of from 2 to 5, each $R^7$ may be the same or different, and when q is an integer of from 2 to 5, each $R^8$ may be the same or different.

20. A method according to claim 19, wherein said diaryl carbonate is diphenyl carbonate, ditolyl carbonate or diphenyl carbonate substituted with a lower alkyl group.

21. A method according to claim 20, wherein said diaryl carbonate is diphenyl carbonate.

22. A method according to claim 1, wherein the heating of the mixture in step (1) is performed at a temperature in the range of from 50° to 350° C. for a period in the range of from 1 minute to 100 hours.

23. A method according to claim 1, wherein the heating of said crystallized prepolymer in step (3) is performed at a temperature (Tp, ° C.) satisfying the following relationships:

$$Tm'-50 \leq Tp < Tm'$$

wherein Tm' represents the melting temperature (° C.) of the crystallized prepolymer, for a period of from 1 minute to 100 hours.

24. A method according to claim 12, wherein the heating for crystallizing the prepolymer is performed at a temperature (Tc, ° C.) satisfying the following relationships:

$$Tm-50 \leq Tc < Tm$$

wherein Tm represents the melting temperature (° C.) of the prepolymer.

25. A method according to claim 23, wherein the heating of said crystallized prepolymer in step (3) is performed at a temperature of from 150° to 260° C.

26. A crystallized aromatic polycarbonate having a weight average molecular weight of from 6,000 to 200,000 and having a terminal hydroxyl group content of not greater than 0.03% by weight, based on the weight of the polycarbonate, which is the same as that produced by a method comprising the steps of:

(1) heating a mixture of a dihydroxydiaryl compound and a diaryl carbonate at a temperature sufficient and for a period of time sufficient to prepare a prepolymer having a weight average molecular weight of from 2,000 to 20,000 and having terminal aryl carbonate groups, said dihydroxydiaryl compound comprising from 85 to 100 mole % of a dihydroxydiaryl alkane represented by the formula:

$$HO-Ar^1-Y-Ar^2-OH \quad (I)$$

wherein each of $Ar^1$ and $Ar^2$ independently represents a divalent carbocyclic or heterocyclic aromatic group, and Y represents a divalent alkane group, and from 0 to 15 mole % of a dihydroxydiaryl derivative other than said dihydroxydiaryl alkane, said terminal aryl carbonate groups being present in an amount of greater than 50 mole %, based on the total number of moles of all the terminal groups of the prepolymer;

(2) crystallizing said prepolymer to a crystallinity of from 5 to 55%; and (3) heating the crystallized prepolymer at a temperature which is higher than the glass transition temperature of said crystallized prepolymer and at which said crystallized prepolymer is in a solid state, thereby increasing the weight average molecular weight of the crystallized prepolymer to from 6,000 to 200,000 so that the resultant polymer has a weight average molecular weight which is greater than that of said prepolymer obtained in step (1).

27. A crystallized aromatic polycarbonate according to claim 26, wherein each of said dihydroxydiaryl compound and said diaryl carbonate contains no chlorine atoms, and the crystallization in step (2) is performed by solvent treatment in a solvent containing no chlorine atoms, so that the crystallized aromatic polycarbonate contains no chlorine atoms.

28. A crystallized aromatic polycarbonate according to claim 26, wherein said terminal hydroxyl group content is not greater than 0.01% by weight.

* * * * *